US009497792B2

(12) United States Patent
Chin et al.

(10) Patent No.: US 9,497,792 B2
(45) Date of Patent: Nov. 15, 2016

(54) ROUTING OF MESSAGES FOR MOBILE COMMUNICATION DEVICES DURING EMERGENCY CALLS

(75) Inventors: Chen Ho Chin, Deerlijk (BE); Richard Charles Burbidge, Hook (GB)

(73) Assignee: BlackBerry Limited, Waterloo, Ontario (CA)

( * ) Notice: Subject to any disclaimer, the term of this patent is extended or adjusted under 35 U.S.C. 154(b) by 781 days.

(21) Appl. No.: 13/514,467

(22) PCT Filed: Jan. 7, 2011

(86) PCT No.: PCT/EP2011/050188
§ 371 (c)(1),
(2), (4) Date: Aug. 16, 2012

(87) PCT Pub. No.: WO2011/083151
PCT Pub. Date: Jul. 14, 2011

(65) Prior Publication Data

US 2012/0302196 A1 Nov. 29, 2012

Related U.S. Application Data

(60) Provisional application No. 61/293,558, filed on Jan. 8, 2010, provisional application No. 61/293,556, filed on Jan. 8, 2010.

(51) Int. Cl.
*H04W 4/22* (2009.01)
*H04W 76/04* (2009.01)
(Continued)

(52) U.S. Cl.
CPC ........ *H04W 76/045* (2013.01); *H04L 65/1016* (2013.01); *H04L 65/1069* (2013.01);
(Continued)

(58) Field of Classification Search
CPC ........................................................ H04W 4/22
USPC ........................................................ 455/404.1
See application file for complete search history.

(56) References Cited

U.S. PATENT DOCUMENTS

2004/0192252 A1 9/2004 Aerrabotu et al.
2005/0090224 A1 4/2005 Dorsey et al.
(Continued)

FOREIGN PATENT DOCUMENTS

CN 1853424 A 10/2006
CN 101621777 A 1/2010
(Continued)

OTHER PUBLICATIONS

Chin, Chen Ho, et al.; U.S. Appl. No. 13/499,644, filed Jul. 12, 2012; Title: System and Method for Determining Establishment Causes for Emergency Sessions.
(Continued)

*Primary Examiner* — Christopher M Brandt
(74) *Attorney, Agent, or Firm* — Conley Rose, P.C.; J. Robert Brown, Jr.

(57) ABSTRACT

A method implemented in a UE. NAS signaling is initiated or performed for an emergency call in order to establish a connection between the UE and one of a plurality of core networks (CNs). In a non-limiting example, the NAS signaling is initiated or performed after the ending of a prior established connection or emergency call. A determination is made whether the UE is already attached for emergency bearer services. Responsive to the UE being already attached for emergency bearer services, a NAS layer of a protocol stack of the UE causes transmission of a UE identification (ID) when requesting a radio resource control (RRC) connection for further NAS signaling. The UE ID includes data which can be used to determine to which CN of the plurality of CNs the connection should be directed.

34 Claims, 11 Drawing Sheets

(51) Int. Cl.
*H04L 29/06* (2006.01)
*H04W 48/00* (2009.01)
*H04W 76/00* (2009.01)

(52) U.S. Cl.
CPC ............ *H04L65/1073* (2013.01); *H04W 4/22* (2013.01); *H04W 48/17* (2013.01); *H04W 76/007* (2013.01); *H04W 76/046* (2013.01)

(56) References Cited

U.S. PATENT DOCUMENTS

| | | | | |
|---|---|---|---|---|
| 2006/0094397 A1* | 5/2006 | Raghuram et al. | ........ | 455/404.1 |
| 2006/0121877 A1* | 6/2006 | Raghuram et al. | ........ | 455/404.2 |
| 2008/0153454 A1* | 6/2008 | Haapapuro et al. | ....... | 455/404.1 |
| 2010/0297979 A1* | 11/2010 | Watfa et al. | ............... | 455/404.1 |

FOREIGN PATENT DOCUMENTS

| | | | | |
|---|---|---|---|---|
| WO | 2010002208 A2 | 1/2010 | | |
| WO | WO 2010/080056 A1 * | 7/2010 | ............ | H04W 28/08 |

OTHER PUBLICATIONS

3GPP TS 23.003 V10.0.0; 3rd Generation Partnership Project; Technical Specification Group Core Network and Terminals; Numbering, Addressing, and Identification; Release 10; Dec. 2010; 77 pages.
3GPP TS 23.060 V10.2.0; 3rd Generation Partnership Project; Technical Specification Group Services and System Aspects; General Packet Radio Service (GPRS); Service Description; Stage 2; Release 10; Dec. 2010; 316 pages.
3GPP TS 23.401 V10.2.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 10; Dec. 2010; 276 pages.
3GPP TS 24.302 V10.2.0; 3rd Generation Partnership Project; Technical Specification Group Core Network and Terminals; Access to the 3GPP Evolved Packet Core (EPC) via Non-3GPP Access Networks; Stage 3; Release 10; Dec. 2010; 56 pages.
3GPP TS 33.401 V9.6.0; 3rd Generation Partnership Project; Technical Specification Group Services and System Aspects; 3GPP System Architecture Evolution (SAE); Security Architecture; Release 9; Dec. 2010; 105 pages.
3GPP TS 36.300 V10.2.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 10; Dec. 2010; 200 pages.
3GPP TS 36.331 V10.0.0; 3rd Generation Partnership Project; Technical Specification Group Radio Access Network; Evolved Universal Terrestrial Radio Access (E-UTRA); Radio Resource Control (RRC); Protocol Specification; Release 10; Dec. 2010; 276 pages.
3GPP TSG WG2 Meeting #74; "Clarification for the Service Request Procedure with Support for Emergency Calls"; S2-094757; Sophia Antipolis, France; Jul. 6-10, 2009; 4 pages.
TSG CT Meeting #46; "LS on Use of Emergency Cause Value for TAU"; CP-091060; Sanya, Hainan, P.R. China; Dec. 2-4, 2009; 5 pages.
PCT International Search Report; Application No. PCT/EP2011/050188; Apr. 6, 2011; 4 pages.
PCT Written Opinion of the International Searching Authority; Application No. PCT/EP2011/050188; Apr. 6, 2011; 5 pages.
3GPP TSG SA WG2 Meeting #62; "Resolving Some MME Selection and Initinal NAS Message Issues"; S2-080545; Marina Del Ray, California; Jan. 14-18, 2008; 5 pages.
3GPP TS 23.122 V9.1.0; 3rd Generation Partnership Project; Technical Specification Group Core Network and Terminals; Non-Access-Stratum (NAS) Functions Related to Mobile Station (MS) in Idle Mode; Release 9; Dec. 2009; 40 pages.
3GPP TS 24.301 V9.1.0; 3rd Generation Partnership Project; Technical Specification Group Core Network and Terminals; Non-Access-Stratum (NAS) Protocol for Evolved Packet System (EPS); Release 9; Dec. 2009; 285 pages.
Chinese Office Action; Application No. 201180005565.3; Jul. 2, 2014; 12 pages.
Chinese Office Action; Application No. 201180005565.3; Mar. 10, 2015; 12 pages.
Chinese Office Action; Application No. 2011800055653; Sep. 25, 2015; 12 pages.

* cited by examiner

ROUTING OF MESSAGES FOR MOBILE COMMUNICATION DEVICES DURING EMERGENCY CALLS

CROSS REFERENCE

This application is a filing under 35 U.S.C. 371 of International Application No. PCT/EP2011/050188 filed Jan. 7, 2011, entitled "Routing of Messages for Mobile Communication Devices During Emergency Calls" claiming priority to U.S. Provisional Application No. 61/293,556 filed on Jan. 8, 2010, entitled "Routing of Messages for Mobile Communication Devices During Emergency Calls" and U.S. Provisional Application No. 61/293,558 filed on Jan. 8, 2010, entitled "Routing of Messages for Mobile Communication Devices During Emergency Calls", which are incorporated by reference herein as if reproduced in their entirety.

BACKGROUND

As used herein, the terms "user equipment" ("UE"), "mobile station" ("MS"), and "user agent" ("UA") might in some cases refer to mobile devices such as mobile telephones, personal digital assistants, handheld or laptop computers, and similar devices that have telecommunications capabilities. The terms "MS," "UE," "UA," user device," and "user node" may be used synonymously herein. A UE might include components that allow the UE to communicate with other devices, and might also include one or more associated removable memory modules, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might consist of the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as Long-Term Evolution (LTE) and LTE-Advanced (LTE-A). For example, an LTE or LTE-A system might be an Evolved Universal Terrestrial Radio Access Network (E-UTRAN) and include an E-UTRAN node B (or eNB), a Home node B (HNB or HeNB), a wireless access point, a relay node, or a similar component rather than a traditional base station. These components may be referred-to as network components.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
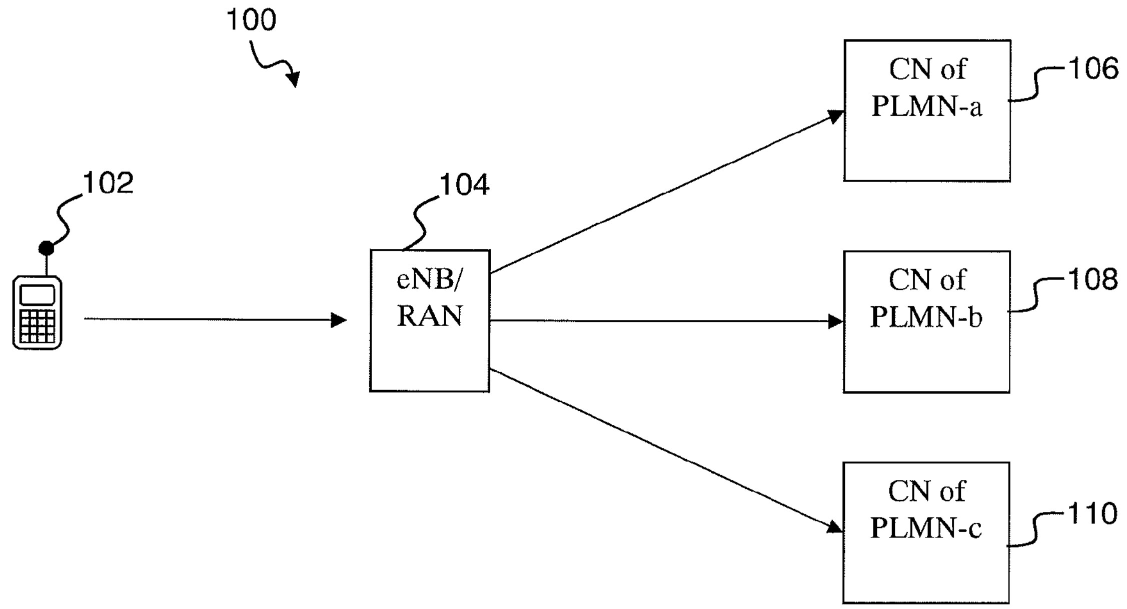
FIG. 1 is a diagram showing a communications network, according to an embodiment of the present disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used throughout the specification, claims, and Figures, the following acronyms have the following definitions. Some of the terms identified below are defined by and follow the standards set forth by the Third Generation Partnership Program (3GPP) technical specifications. Where the 3GPP technical specifications use a term using the same acronym or words as those presented below, the 3GPP technical specifications describe the definition and functions of the corresponding term. However, the embodiments described herein use these components and/or functions according to inventive techniques described herein. Some of the following terms may not be described in the 3GPP specifications.

"ARP" is defined as "Allocation and Retention Policy."

"AS" is defined as "Access Stratum."

"BCCH" is defined as "Broadcast Control Channel."

"CN" is defined as "Core Network."

"CS" is defined as "Circuit Switched."

"EMM" is defined as "EPS MM."

"EPC" is defined as "Evolved Packet Core."

"EPS" is defined as "Evolved Packet System."

"ESM" is defined as "EPS SM."

"E-UTRAN" is defined as "Evolved UTRAN."

"GUMMEI" is defined as "Globally Unique MME Identifier."

"GUTI" is defined as "Globally Unique Temporary Identity."

"ID" is defined as "Identifier" or "Identification."

"IE" is defined as "Information Element."

"IM" is defined as "IP Multimedia."

"IMEI" is defined as "International Mobile Equipment Identifier."

"IMS" is defined as "IP Multimedia Subsystem."

"IMSI" is defined as "International Mobile Subscriber Identity."

"LA" is defined as "Location Area."

"MCC" is defined as "Mobile Country Code."

"MM" is defined as "Mobility Management."

"MME" is defined as "MM Entity."

"MMEC" is defined as "MME Code."

"MMEGI" is defined as "MME Group ID."

"MMEI" is defined as "MME Identifier."

"MNC" is defined as "Mobile Network Code."

"MS" is defined as "Mobile Station."

"M-TMSI" is defined as "MME-TMSI."

"NAS" is defined as "Non-Access Stratum."

"NB" is defined as "Node B."

"NNSF" is defined as "NAS Node Selection Function."

"PDN" is defined as "Packet Data Network."

"PLMN" is defined as "Public Land Mobile Network."

"PS" is defined as "Packet Switched."

"PSAP" is defined as "Public Safety Answering Point."

"P-TMSI" is defined as "Packet TMSI."

"RA" is defined as "Routing Area."

"RAN" is defined as "Radio Access Network."

"RAT" is defined as "Radio Access Technology."

"RRC" is defined as "Radio Resource Control."

"SAE" is defined as "System Architecture Evolution."

"SIP" is defined as "Session Initiated Protocol."

"SM" is defined as "Session Management."

"S-TMSI" is defined as "SAE TMSI."

"TA" is defined as "Tracking Area."

"TAU" is defined as "TA Update."

"TIN" is defined as "Temporary Identity used in Next update."

"TMSI" is defined as "Temporary Mobile Subscriber Identity."

"TS" is defined as "Technical Specification."

"UE" is defined as "User Equipment."

"UMTS" is defined as "Universal Mobile Telecommunications System."

"UTRAN" is defined as "UMTS Terrestrial RAN."

As used herein the following values have the following definitions:

<GUTI>=<GUMMEI><M-TMSI>

<GUMMEI>=<MCC><MNC><MME Identifier>

<MME Identifier>=<MME Group ID><MME Code>

<S-TMSI>=<MMEC><M-TMSI>

As used herein, the term "attached for emergency bearer services" may be defined in the 3GPP TS, but may also include a UE having an "emergency bearer," an "emergency session," or an "emergency registration." Likewise, the term "emergency bearer" or "emergency bearers" may be defined in the 3GPP TS, but may also include one or more of the terms "emergency session," "IMS emergency session," or "emergency registration."

As used herein, the term "NAS signaling" may refer to NAS signaling alone, or may refer to any NAS signaling used with respect to either initiating or receiving calls. "NAS signaling" may include performing a TAU, and may also include other procedures for which NAS messages might be exchanged.

With respect to the embodiments described herein, the terms "related call" or "related signaling" mean that the second emergency call or signaling procedure should be or is desired to be, for whatever reason, routed to the same CN or EPC to which the first emergency call was routed. Alternatively, the term "related" may also mean that the second call is received by the UE as a result of the first emergency call, such as when a PSAP attempts to return a call to the same UE that made the first emergency call, or when any other subsequent call is made to the UE for reasons associated with the first emergency call.

The embodiments described herein address an issue that may arise when a first emergency call is placed by a UE in limited service state with one EPC/CN, the emergency call is ended, the UE returns to IDLE mode but remains attached for emergency bearer services, and then thereafter the UE performs a TAU. Although the first emergency call might be established with a first EPC/CN, the TAU or subsequent connection (whether initiated, performed, or received by the UE) might be routed to a second, different EPC/CN. If this situation occurs, then the second EPC/CN might not have information needed or desired to be able to reconnect with the UE.

Note that a normal registered UE, or a UE that is not in limited service state, can likewise start an IMS emergency call. In so doing, the UE may be attached for emergency bearer services. If that UE then returns to IDLE mode and subsequently performs a TAU while still attached for emergency bearer services, the issue described above might likewise arise. This issue could possibly extend to the situation in which the UE, having returned to IDLE mode, later initiates other NAS signaling. This issue might also extend to the situation when a second, different but related emergency call is placed or received.

In an embodiment, the NAS of the UE (when attached for emergency bearer services or when in an emergency session or transaction), when doing a TAU (an example of UE control/NAS signaling) may not provide an S-TMSI or any other mobile identity to the AS other than an RRC establishment cause set equal to "emergency call." Without the NAS provided S-TMSI, the AS of UE may fill in a random number as the UE-ID for an RRC_CONNECTION_REQUEST message. The RRC establishment cause of "emergency call" given by NAS may also go into the establishment cause of the RRC_CONNECTION_REQUEST message. When the network component receives the RRC_CONNECTION_REQUEST message with a UE-identity equal to a random number and the establishment cause is “emergency call,” the network component may consider that the UE is starting an IMS emergency session in a limited service state, and may perform MME selection. When this event occurs, the MME that actually receives the TAU might not be the MME where the UE’s context is held, that is the registered MME. Accordingly, the TAU might fail and the emergency session risks being dropped.

The embodiments described herein provide at least three techniques for addressing this and other issues described herein. In a first embodiment, the UE NAS may provide a UE ID when requesting an RRC connection when the UE has emergency bearers, when in an emergency session, or when emergency registered. This UE ID may be the S-TMSI, but may be some other convenient ID, as described further below. Possibly, the NAS may be required to provide both the UE ID and one or more of the GUMMEI, MMEI, or MMEC.

In a second embodiment, both the S-TMSI and GUMMEI or MMEI may be provided by the UE when certain conditions are met, and the network component will detect the MMEI or GUMMEI. In this embodiment, when initially requesting an emergency call, the registered MME field within an RRC_CONNECTION_SETUP_COMPLETE message may be left blank or be indicated as invalid. For a subsequent RRC connection request, while the UE is still attached for emergency bearer services, the UE NAS may provide a valid GUMMEI, MMEI or MMEC. Ultimately, if the registered MME field does not exist or is invalid, then the network component may perform MME selection. However, if the registered MME field exists and is valid, then the network component may not perform MME selection, but rather route the subsequent NAS message towards the MME indicated in the registered MME field.

In a third embodiment, the S-TMSI may be provided by the NAS when requesting an RRC connection if the NAS is already registered for emergency services, has emergency bearers, or has an emergency session. The network component may use the MMEC part of the S-TMSI that is provided in the RRC_CONNECTION_REQUEST message to determine to which MME the NAS message should be forwarded.

In a fourth embodiment, the NAS when requesting an RRC connection decides if the network component is allowed to make a MME selection and sets an indicator accordingly. This indicator is provided to the network component by the AS during the RRC connection establishment procedure (in RRC_CONNECTION_REQUEST or in RRC_CONNECTION_SETUP_COMPLETE) and is used in network component to further guide the network component on its MME selection process. Other, additional, embodiments are also described herein.

FIG. 1 is a diagram showing a communications network, according to an embodiment of the present disclosure. The communication system 100 shown in FIG. 1 is exemplary only, as many other arrangements are possible. Additionally more, fewer, or different components may be present. As described above, the embodiments described herein relate to handling emergency calls, which might sometimes be handled by multiple different CNs. FIG. 1 illustrates how different CNs might be used to facilitate communications to and from UE 102.

Figure 14:
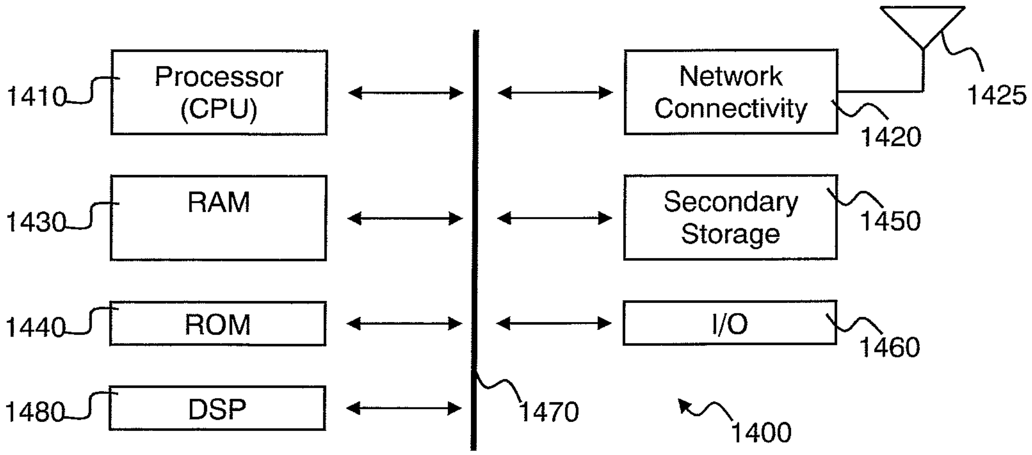
FIG. 14 illustrates a system including a processor and related components suitable for implementing the several embodiments of the present disclosure.

Communication system 100 includes UE 102, which might have components such as those shown in FIG. 14. UE 102 communicates with the eNB/RAN 104. In turn, eNB/RAN 104 may direct communications from the UE 102 to one of several CNs of one or more PLMNs. Thus, eNB/RAN 104 might direct communications from UE 102 to one of the CN for PLMN-a 106, the CN for PLMN-b 108, or the CN for PLMN-c 110. The corresponding CN will facilitate the communication of UE 102 to another UE and/or to a source of data. A CN may comprise a number of core network elements which may include, are but not limited to, one or more MMEs, Serving Gateways (S-GWs) and PDN Gateways (P-GWs). Signaling communication between the UE 102 and a CN, for example CN of PLMN-a 106, may take place between the UE and an MME of that CN. User data communication between the UE 102 and a CN may take place between the UE and a S-GW and/or P-GW of that CN.

Due to the relatively high expense of setting up and maintaining a network infrastructure, pressure often exists to reduce and optimize network infrastructure costs. One technique for reducing infrastructure costs is network sharing. Network sharing effectively allows network operators to share one or more RANs or network components between two or more CNs or PLMNs. Thus, for example, although a first operator may be responsible for servicing UE 102 and maintaining the CN of PLMN-a 106, a communication to or from UE 102 might also be facilitated via CN of PLMN-c 110, which is operated by a different second operator. Although not shown in FIG. 1, UE 102 might also communicate with a different eNB/RAN operated by the second operator. An agreement between the first and second operators may govern which equipment is used and what fees are paid by whom.

In a system where network sharing is utilized, to enable a UE to communicate to the correct PLMN, the UE NAS may provide a PLMN ID to the UE AS when requesting the RRC to establish a radio connection. That PLMN ID may be passed to the eNB, allowing the eNB to know which PLMN to select.

The PLMN ID may be provided at the NAS level. The NAS may be a layer or set of layers in a protocol stack used for communication between a CN (106, 108, or 110) and the UE 102. The NAS layer may support signaling and traffic between the CN and the UE. In turn, the AS may be a layer or set of layers in a protocol stack for communication between an eNB/RAN 104 and the UE 102. The RRC may be one protocol layer within the AS.

A protocol stack may be a set of software modules, possibly hardware elements, that facilitate communication in a device such as a UE or a network component. Individual protocols within a stack may be designed for one or more functions. By separating the functions of the various software or hardware modules into a stack, design and evaluation of desired or required communications software may be simplified. The lowest protocol in a stack may handle low-level, or physical, interactions with hardware. Higher layers may add more features. In an embodiment, user applications may reflect interactions with the topmost layers of a protocol stack. In an embodiment, the NAS is an intermediate layer, though the precise location of the NAS layer within a protocol stack may vary depending on implementation.

Figure 2:
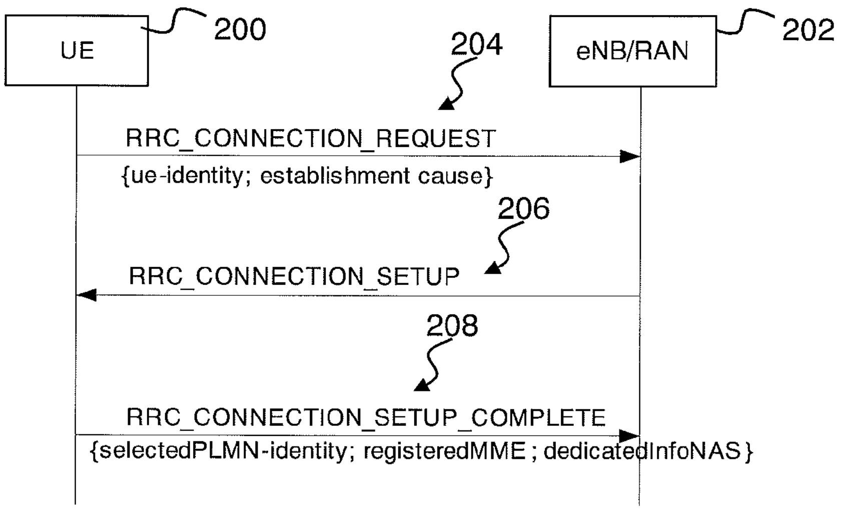
FIG. 2 is a sequence diagram showing a three-way signaling handshake for RRC connection establishment, according to an embodiment of the present disclosure.

FIG. 2 is a sequence diagram showing a three-way signaling handshake for RRC connection establishment, according to an embodiment of the present disclosure. The signaling handshake procedure shown in FIG. 2 may be implemented between a UE 200 and an eNB/RAN 202 or other network component. UE 200 may be UE 102 of FIG. 1, and likewise eNB/RAN 202 may be eNB/RAN 104 of FIG. 1.

In an embodiment, the UE 200 first transmits an RRC_CONNECTION_REQUEST message 204 to the eNB/RAN 202. This message 204 may transmit information such as a UE ID and/or an establishment cause. The UE ID uniquely identifies the UE, and the establishment cause identifies the purpose of a call or request for access.

In response, the eNB/RAN 202 transmits an RRC_CONNECTION_SETUP message 206 to the UE 200. This message 206 informs the UE that the connection between the UE 200 and the eNB/RAN 202 has been setup.

Finally, the UE 200 transmits a RRC_CONNECTION_SETUP_COMPLETE message 208 back to the eNB/RAN 202. This message informs the eNB/RAN 202 that the connection is complete. Additional information may also be transmitted, such as but not limited to a selected PLMN identity, a registered MME, and/or dedicated NAS information which can contain an entire initial NAS message which may be referred-to as the initial Layer 3 message.

Additional details regarding the above-described communication handshake will now be provided. To establish a communication session, communication transaction, communication channel, or communication link between peer entities, a protocol signaling system is used that includes signaling messages that act as handshakes that facilitate the establishment of a session, transaction, channel, or link. In particular, FIG. 2 illustrates how three way signaling messages might flow to establish the RRC connection for the NAS of the UE 200 and the NAS of the CN (via eNB/RAN 202) such that these elements may communicate with each other.

Regarding the various embodiments described herein, some contents of what may be carried in the RRC_CONNECTION_REQUEST message 204 and the RRC CONNECTION_SETUP_COMPLETE message 208 are described. In FIG. 2, the contents or information in these messages may be referred to as IEs. Exemplary IEs are shown within the parentheses below those messages. The details of these IEs are presented below. These detailed IEs are exemplary only, as they may be varied to suit a particular purpose.

The following IE is an exemplary IE for a RRC_CONNECTION_REQUEST message:

```
-- ASN1START
RRCConnection Request ::=           SEQUENCE {
    critical Extensions                 CHOICE {
        rrcConnectionRequest-r8             RRCConnectionRequest-r8-IEs,
        criticalExtensionsFuture            SEQUENCE { }
    }
}
RRCConnectionRequest-r8-IEs ::=SEQUENCE {
    ue-Identity                         InitialUE-Identity,
    establishmentCause                  EstablishmentCause,
    spare                               BIT STRING (SIZE (1))
}
InitialUE-Identity ::=              CHOICE {
    s-TMSI                              S-TMSI,
    randomValue                         BIT STRING (SIZE (40))
}
EstablishmentCause ::=   ENUMERATED {
            emergency, highPriorityAccess, mt-Access, mo-Signalling,
            mo-Data, spare3, spare2, spare1}
-- ASN1STOP
```

The following table is an exemplary set of field descriptions for the immediately preceding IE.

| RRCConnectionRequest field descriptions |
|---|
| ue-Identity |
| UE identity included to facilitate contention resolution by lower layers. |
| establishmentCause |
| Provides the establishment cause for the RRC connection request as provided by the upper layers. With respect to the cause value names: highPriorityAccess concerns AC11 . . . AC15, 'mt' stands for 'Mobile Terminating' and 'mo' for 'Mobile Originating. |
| randomValue |
| Integer value in the range 0 to $2^{40} - 1$. |

The following IE is an exemplary IE for a RRC_CONNECTION_SETUP_COMPLETE message:

```
-- ASN1START
RRC_CONNECTION_SETUP_COMPLETE ::= SEQUENCE {
    rrc-TransactionIdentifier       RRC-TransactionIdentifier,
    criticalExtensions              CHOICE {
      c1                            CHOICE{
      RRC_CONNECTION_SETUP_COMPLETE-r8
RRC_CONNECTION_SETUP_COMPLETE-r8-IEs,
      spare3 NULL, spare2 NULL, spare1 NULL
      },
      criticalExtensionsFuture      SEQUENCE { }
    }
}
RRC_CONNECTION_SETUP_COMPLETE-r8-IEs ::= SEQUENCE {
    selectedPLMN-Identity           INTEGER (1..6),
    registeredMME                   RegisteredMME      OPTIONAL,
    dedicatedInfoNAS                DedicatedInfoNAS,
    nonCriticalExtension            SEQUENCE { }       OPTIONAL
}
RegisteredMME ::=               SEQUENCE {
    plmn-Identity                   PLMN-Identity      OPTIONAL,
    mmegi                           BIT STRING (SIZE (16)),
    mmec                            MMEC
}
-- ASN1STOP
```

The following table is an exemplary set of field descriptions for the immediately preceding IE.

| RRC_CONNECTION_SETUP_COMPLETE field descriptions |
| --- |
| selectedPLMN-Identity |
| Index of the PLMN selected by the UE from the plmn-IdentityList included in SIB1. 1 if the 1st PLMN is selected from the plmn-IdentityList included in SIB1, 2 if the 2nd PLMN is selected from the plmn-IdentityList included in SIB1 and so on. registeredMME |
| This field is used to transfer the GUMMEI of the MME where the UE is registered, as provided by upper layers. mmegi |
| Provides the Group Identity of the registered MME within the PLMN, as provided by upper layers, see TS 23.003 [27]. |

Additional details regarding the UE identity are now provided. In an exemplary, non-limiting embodiment, the UE may or shall set the contents of the RRC_CONNECTION_REQUEST message as follows:

1> Set the UE-Identity as follows:
 2> if upper layers provide an S-TMSI:
  3> set the UE-Identity to the value received from upper layers;
 2> else:
  3> draw a random value in the range 0 . . . 240-1 and set the UE-Identity to this value;

In an embodiment, the upper layers may provide the S-TMSI if the UE is registered in the TA of the current cell.

Figure 3:
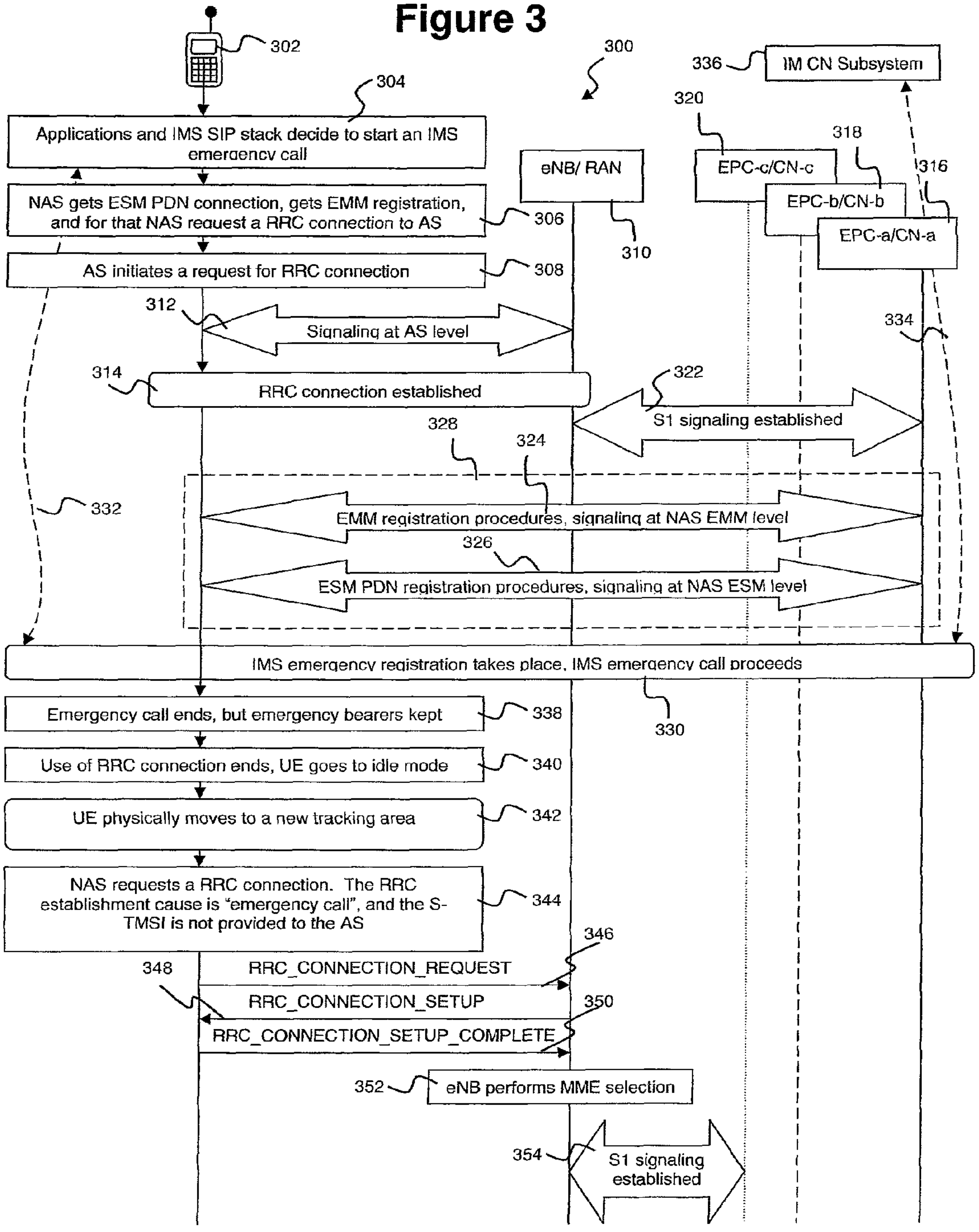
FIG. 3 is a sequence diagram showing a procedure for placing and tracking an emergency call, according to an embodiment of the present disclosure.

In an exemplary, non-limiting embodiment, the UE may or shall set the contents of the RRC_CONNECTION_SETUP_COMPLETE message as follows:

The UE may or shall:

1> set the content of RRC_CONNECTION_SETUP_COMPLETE message as follows:
 2> set the selectedPLMN-Identity to the PLMN selected by upper layers (see TS 23.122[11], TS 24.301[35]) from the PLMN(s) included in the plmn-IdentityList in SystemInformationBlockType1;
 2> if upper layers provide the 'Registered MME', include and set the registeredMME as follows:
  3> if the PLMN identity of the 'Registered MME' is different from the PLMN selected by the upper layers:
   4> include the plmnIdentity in the registeredMME and set it to the value of the PLMN identity in the 'Registered MME' received from upper layers;
  3> set the mmegi and the mmec to the value received from upper layers;
 2> set the dedicatedInfoNAS to include the information received from upper layers;
 2> submit the RRC_CONNECTION_SETUP_COMPLETE message to I lower layers for transmission, upon which the procedure ends;

FIG. 3 is a diagram showing a procedure for placing and tracking an emergency call, according to an embodiment of the present disclosure. The procedure 300 shown in FIG. 3 builds on the procedures shown in FIG. 1 and FIG. 2. The procedure 300 shown in FIG. 3 illustrates an issue that may arise when a first emergency call is placed by a UE in limited service state with one EPC/CN, the emergency call ends, the UE returns to IDLE but remains attached for emergency bearer services, and later the UE, from IDLE, performs a TAU. Although the first emergency call might be established with a first EPC/CN, the second TAU might be routed to a second, different EPC/CN. If this situation occurs, then the second EPC/CN might not have information needed or desired to be able to reconnect with the UE 302. The procedures described below illustrate this issue in detail.

Note that a UE that is in a normal registered state, or a UE that is not in limited service state, can likewise start an IMS emergency call. In so doing, the UE may be attached for emergency bearer services. If that UE then returns to IDLE mode and subsequently performs a TAU while still attached for emergency bearer services, the described issue might likewise arise. The issue could possibly extend to the UE having returned to IDLE and later initiating or performing other NAS signaling, or when a second, different but related emergency call is placed.

The procedure 300 begins as UE 302 initiates a first emergency call. Specifically, the applications and IMS SIP stack decide to start an IMS emergency call (block 304). Next, the NAS may get or obtain an ESM PDN connection, may get or obtain EMM registration, and for that NAS request a RRC connection to the AS (block 306). The AS then initiates a request for a RRC connection (block 308). Signaling is then performed at the AS level between the UE 302 and the eNB/RAN 310 (block 312). The details of this signaling may be similar to the signaling described with respect to FIG. 2. At this point, an RRC connection is established between the UE 302 and the eNB/RAN 310 (block 314).

The eNB/RAN 310 then attempts to establish a connection between itself and one of several EPCs and/or CNs, such as EPC-a/CN-a 316, EPC-b/CN-b 318, or EPC-c/CN-c 320. Specifically, S1 signaling establishment takes place between the eNB/RAN 310 and EPC-a/CN-a 316 (block 322). During this signaling, the UE's NAS message that may have been provided as part of the RRC_CONNECTION_SETUP_COMPLETE message (as described for FIG. 2) may be routed to the corresponding PLMN.

Next, EMM registration procedures take place between the UE 302 and EPC-a/CN-a 316, with signaling at the NAS EMM level (block 324). Also, ESM PDN registration procedures take place between the UE 302 and EPC-a/CN-a 316, with signaling at the NAS ESM level (block 326). The ESM procedure and the EMM procedure may run in parallel, and initiated ESM messages (of UE 302 and EPC-a/CN-a 316) may be piggybacked on EMM messages (of UE 302 and EPC-a/CN-a 316). Thus, procedures 324 and 326 are indicated as taking place within the phantom box 328.

At this point, IMS emergency registration takes place followed by establishment of the IMS emergency call. The first IMS emergency call is now active, and the call proceeds (block 330). Phantom lines 332 and 334 show that the connection is established between the IMS SIP stack of UE 302 and the IM CN subsystem 336.

For the embodiment shown in FIG. 3, the emergency call ends; however, the emergency bearers may be kept (block 338). Situations exist where the UE may end an IMS emergency registration or a NAS emergency session, or the UE may terminate the emergency bearer services. However, possibly the CN or even the IMS subsystem may make the decision to keep emergency bearers open even if the emergency call ends. One reason to do so would be to allow a PSAP to quickly return a call to the UE 102, which may be referred to as an emergency callback. Another reason to do so would be to allow the UE 102 to quickly re-establish the emergency call in case the user decides to place another related call, or in case the first call is dropped.

Once the emergency call is ended, but the emergency bearers are kept, use of the RRC connection ends, the RRC connection may be released, and the UE may return to idle mode (block 340). In the embodiment shown in FIG. 3, the UE physically moves to a new TA, whereupon a TAU procedure may be required or desired (block 342). The TAU procedure is a signaling procedure that is performed in order to inform the EPC-a/CN-a 316 of the UE's location in the new TA. By informing the EPC-a/CN-a 316 of the UE's new location, the EPC-/CN-a may be able to efficiently route any mobile terminated call, such as a return call from the PSAP (an emergency callback).

In order to perform a TAU procedure, a second, RRC connection may be required or desired. In the embodiment shown in FIG. 3, the second connection establishment occurs as a result of the TAU procedure; however in other embodiments the second connection establishment may occur as a result of a second emergency call being initiated by the user. The second connection establishment might occur as a result of some other cause. The NAS requests an RRC connection, designating the RRC establishment cause as "emergency call," and the S-TMSI is not provided to the AS (block 344). The RRC_CONNECTION_REQUEST message is then sent from the UE 302 to the eNB/RAN 310 (block 346). In response, the RRC_CONNECTION_SETUP message is sent from the eNB/RAN 310 to the UE 302 (block 348). In turn, the RRC_CONNECTION_SETUP_COMPLETE message is sent from the UE 302 to the eNB/RAN 310 (block 350). The eNB/RAN 310 then may perform MME selection (block 352) and may select EPC-c/CN-c (block 354). If EPC-c/CN-c (block 354) includes more than one MME providing service within a given area, then the MME selection (block 352) may also include the selection of one MME among the MMEs of EPC-c/CN-c (block 354). S1 signaling is then established between the eNB/RAN 310 and EPC-c/CN-c 320 (block 354), though some other form of signaling may be used in some embodiments. Note that the selected EPC/CN for the TAU procedure (EPC-c/CN-c 320) is different than the EPC/CN selected for the first emergency call (EPC-a/CN-a 316).

Thus, the UE's NAS TAU message is routed to PLMN-c/EPC-c; however, the UE's registration context may be with PLMN-a/EPC-a. As a result, the TAU procedure could fail, and because of such a failure a second emergency call, or even another emergency call from a PSAP, may not be properly routed to the UE 302. Possibly, the UE will not be able to establish the call, or the PSAP might not be able to return a call to the UE 302.

Thus, the embodiment shown in FIG. 3 describes an issue that can arise with respect to NAS signaling during emergency calls by UE in limited service state in shared network configurations where multiple EPCs/CNs are available. The following paragraphs provide additional details regarding this issue and regarding FIG. 3 generally. Although, as previously described, a normal registered UE that is attached for emergency bearer services can face the same issue with respect to NAS signaling.

The following information is helpful to understanding the issue presented above. A UE may be in a situation where it is not within radio coverage of a desired network on which the UE is permitted to obtain normal services, such as to place and receive calls, but may be within radio coverage of other networks on which it is not permitted to obtain normal service. A UE in such a situation may be described as being in a limited service state, and in this state the UE may still attempt emergency calls. An IMS emergency call by a UE in a limited service state may be detected by the eNB by use of a random number for Initial UE-Identity and an "emergency call" establishment cause value in the RRC_CONNECTION_REQUEST message. The eNB may then perform MME selection according to the PLMN selected by the UE and, if that PLMN does not support IMS emergency calls, the eNodeB may route the signaling to the MME of another shared PLMN that supports IMS emergency call.

The UE sets the RRC establishment cause to "emergency call," for example as defined in 3GPP TS 36.331, when the UE requests an RRC connection for an emergency signaling procedure. Such a signaling procedure may be a TAU procedure, attach procedure, service request procedure, or some other signaling procedure.

Third, for routing of the initial NAS message to the appropriate MME, the UE NAS may provide the lower layers with either the S-TMSI or the registered GUMMEI that includes the PLMN ID, the MME group ID, and/or the MME code according to the following rules:

One rule may be that when the UE is registered in the tracking area of the current cell during the NAS signaling connection establishment, the UE NAS may or shall provide the lower layers with the S-TMSI, but may or shall not provide the registered MME identifier to the lower layers. As a possible exception, when the UE in EMM-IDLE mode performs a TAU or combined TAU procedure for load balancing purposes, the UE NAS may or shall provide the lower layers with neither S-TMSI nor registered MME identifier.

Another rule may be that when the UE is not registered in the tracking area of the current cell during the NAS signaling connection establishment, the UE NAS might not provide the lower layers with the S-TMSI. Instead, a) if the TIN indicates "GUTI" or "RAT-related TMSI", or the TIN is not available, and the UE holds a valid GUTI, the UE NAS may or shall provide the lower layers with the MME identifier part of the valid GUTI. Alternatively, b) if the TIN indicates "P-TMSI" and the UE holds a valid P-TMSI and RAI, the UE NAS may or shall provide the lower layers with the MME identifier part of the mapped GUTI, which may be generated from the P-TMSI and RAI.

From the above information, an issue that may arise is that when performing a TAU the NAS of the UE in IDLE mode, but remains attached for emergency bearer services, may not provide an S-TMSI or any mobile identity to the AS, but an RRC establishment cause is equal to "emergency call." Without the NAS provided S-TMSI, the AS of UE may fill in a random number as the UE-identity for the RRC_CONNECTION_REQUEST message. The RRC establishment cause of "emergency call" given by NAS may also go into the establishment cause of the RRC_CONNECTION_REQUEST message. When the eNB receives the RRC_CONNECTION_REQUEST message with a UE-identity equal to a random number and the establishment cause is "emergency call," the eNB may consider that the UE is starting an IMS emergency session in a limited service state and may perform MME selection. When this event occurs, the MME that receives that TAU might not be the registered MME of the UE. Accordingly, the TAU might fail and the emergency session risks being dropped.

If the TAU goes to the wrong MME, the reallocation of the serving MME may take place. This procedure may incur some extra signaling within the network, but this procedure should not result in a failure or loss of the session. Nevertheless, to avoid the network signaling, it may be preferable for the TAU to go back to the original registered MME. However, this situation may be different for a UE in a limited service state that is registered for emergency bearer services, especially if the selected target MME is of a PLMN different than the PLMN to which the UE is registered or attached for emergency bearer services. This scenario may likely result in a failure of the TAU.

The issue described above may occur when the UE is initiating or performing NAS signaling from IDLE mode. In the past, for example in earlier generations of mobile communication networks, a UE in an emergency session was considered to always stay in CONNECTED mode. However, other cases may arise where the UE in an emergency session does not stay in CONNECTED mode. For instance, after ending an emergency call, a UE could be kept with an emergency registration in case of callbacks or in case of making another emergency call. Additionally, the UE could move during the emergency session and cross boundaries between TAs. When crossing a boundary between TAs, the UE may perform a TAU to inform the MME of the UE's mobility.

Figure 4:
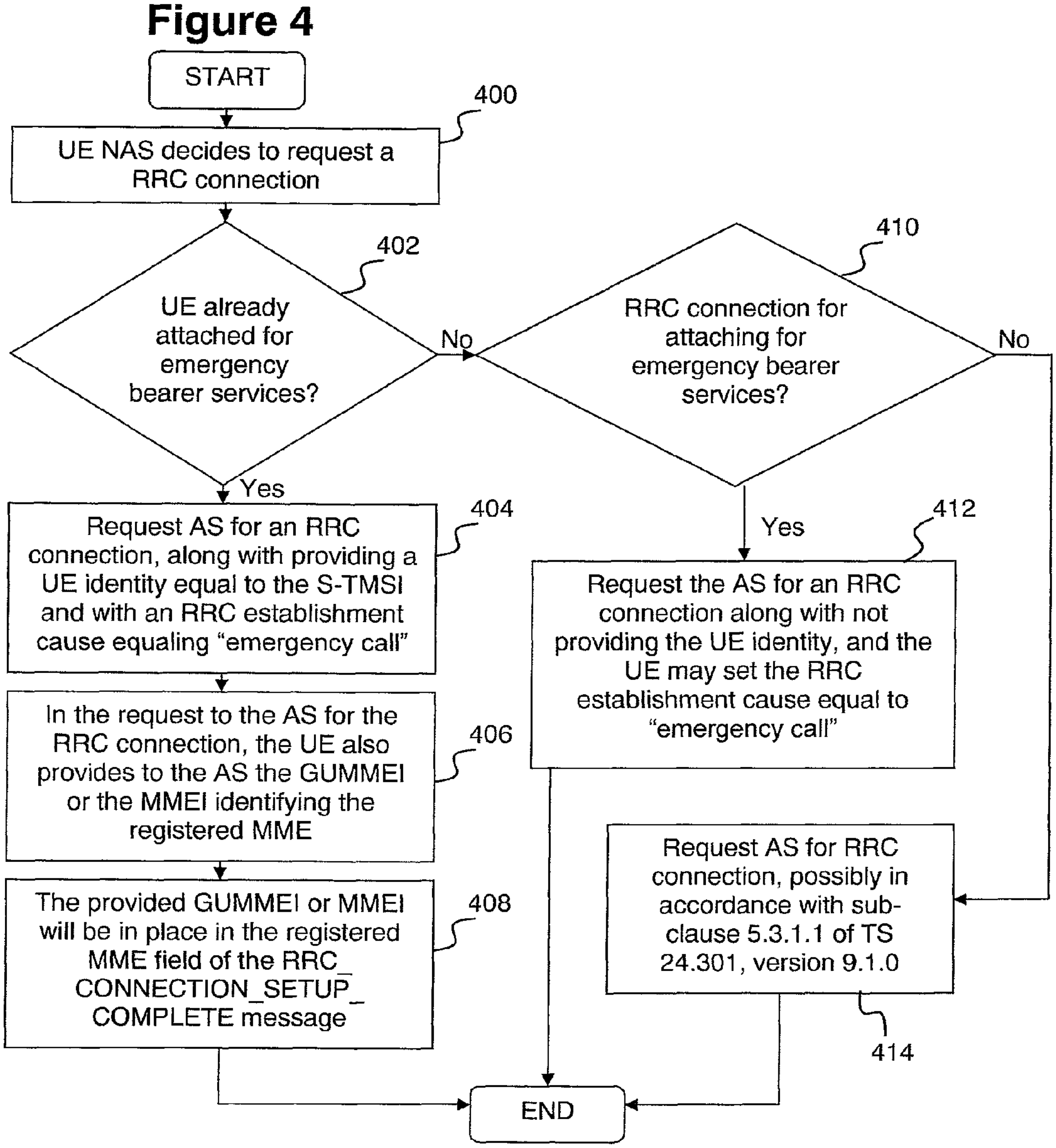
FIG. 4 is a flowchart of a UE procedure for NAS provisioning of a UE ID when attached for emergency bearer services, according to an embodiment of the present disclosure.

FIG. 4 is a flowchart of a UE procedure for NAS provisioning of a UE ID when attached for emergency bearer services, according to an embodiment of the present disclosure. The process shown in FIG. 4 may be implemented in a communications network such as those shown in FIGS. 1-3. The process shown in FIG. 4 may be implemented using a UE, such as those described in FIGS. 1-3 and FIG. 14. The process shown in FIG. 4 may be used to address the issues described above.

The process begins as the UE NAS decides to request an RRC connection (block 400). A determination is then made whether the UE is already attached for emergency bearer services (block 402). If so, then the UE requests AS for an RRC connection, along with providing a UE identity equal to the S-TMSI and with an RRC establishment cause equaling "emergency call" (block 404). In the request to the AS for the RRC connection, the UE also provides to the AS the GUMMEI or the MMEI identifying the registered MME (block 406). The provided GUMMEI will then be in place in the registered MME field of the RRC_CONNECTION_SETUP_COMPLETE message (block 408). The process terminates thereafter.

The provision of the GUMMEI or the MMEI may have already been specified, but in an embodiment that is when S-TMSI is not provided. Within the conditions set out herein, the GUMMEI may also be provided when the S-TMSI is provided.

Returning to block 402, if the UE is not attached for emergency bearer services, then the UE makes a determination if the RRC connection is for attaching for emergency bearer services (block 410). If so, then the UE may request the AS for an RRC connection along with not providing the UE identity, and the UE may set the RRC establishment cause equal to "emergency call" (block 412). If not, then the UE may request the AS for a RRC connection in accordance with a procedure, which may be in an embodiment subclause 5.3.1.1 of 3GPP TS 24.301, version 9.1.0 (block 414). However, some other RRC connection procedure may be used. The process terminates thereafter.

In this embodiment, the UE NAS may be required or desired to provide a UE-identity when requesting an RRC connection when the UE has emergency bearers, when the UE is in an emergency session, or when the UE is emergency registered. This UE-identity may be the S-TMSI, but in other embodiments the NAS can use and provide other UE-identities available to it, such as but not limited to the IMSI or IMEI. As part of this embodiment, along with providing S-TMSI when requesting an RRC connection, the NAS may be required to provide the GUMMEI or the MME identifier, and/or may also be required to provide the MMEC as well.

In an embodiment, when the NAS first requests an RRC connection to support initiation of IMS emergency session, the NAS at that time might not have any emergency bearers or an emergency session. So, for this first request for an RRC connection, the NAS may still behave as currently specified. In other words, the NAS might not provide an S-TMSI to the AS.

With the NAS providing a UE-identity, the AS might not have to fill in a random number. Thus, the eNB might not detect that the UE is making an IMS emergency call in a limited service state. For this reason, the eNB might not perform MME selection.

The following is a summary of UE behavior for the embodiment described with respect to FIG. 4. If the UE is not attached for emergency bearer services and the UE is requesting an RRC Connection in order to perform an attach for emergency bearer services, then the UE may send, within the RRC_CONNECTION_REQUEST message, one or more of the following. First, the UE may send a UE ID that is set to a random value. Second, the UE may send an establishment cause that is set to "emergency call." If the UE is attached for emergency bearer services and the UE is requesting an RRC Connection, for a TAU or for other NAS messages, then the UE may send, within the RRC_CONNECTION_REQUEST message a UE ID that is set according to the S-TMSI received from the network when the UE performed the attach for emergency bearer services. In an embodiment, the UE may also send within the RRC_CONNECTION_REQUEST message and/or within the RRC_CONNECTION_SETUP_COMPLETE message an establishment cause that is set to "emergency call." The UE may also send the UE's registered GUMMEI, registered MMEI, or registered MMEC in these messages or in some other message.

Note that when a UE performs a TAU procedure, the UE would likely have an S-TMSI, possibly a GUTI, unless the UE was performing a TAU due to inter-system change from 2G to 3G. An issue that may arise in this case is that the UE, in the case of doing a normal TAU, not periodic TAU, may deliberately not provide the S-TMSI. This procedure allows the eNB to perform MME selection.

Note that at the RRC level for the RRC connection establishment procedure, the S-TMSI may be used for contention resolution. Thus, even if the UE fills the S-TMSI field with unusable information, the information will simply go to eNB and be echoed back in the RRC_CONNECTION_ SETUP message, for UE to check contention resolution. Possibly, the S-TMSI may not be used at that procedure level. However, the S-TMSI may then be passed from the eNB to the MME when establishing the S1-connection, and used later by MME for context checking and/or retrieval.

The following embodiment is a specific example of the technique described above. The following embodiment does not limit the other embodiments described herein.

For the routing of the initial NAS message to the appropriate MME, the UE NAS provides the lower layers with either the S-TMSI or the registered globally unique MME identifier (GUMMEI) that consists of the PLMN ID, the MME group ID, and the MME code (see 3GPP TS 23.003) according to the following rules:

1) When the UE is registered in the tracking area of the current cell during the NAS signaling connection establishment, the UE NAS shall provide the lower layers with the S-TMSI, but shall not provide the registered MME identifier to the lower layers. Exceptionally, when the UE in EMM-IDLE mode performs a TAU or combined TAU procedure for load balancing purposes, the UE NAS shall provide the lower layers with neither S-TMSI nor registered MME identifier.

2) When the UE is not attached for emergency bearer services but is not registered in the tracking area of the current cell during the NAS signaling connection establishment, the UE NAS does not provide the lower layers with the S-TMSI. Instead, a) if the TIN indicates "GUTI" or "RAT-related TMSI", or the TIN is not available, and the UE holds a valid GUTI, the UE NAS shall provide the lower layers with the MME identifier part of the valid GUTI; or b) if the TIN indicates "P-TMSI" and the UE holds a valid P-TMSI and RAI, the UE NAS shall provide the lower layers with the MME identifier part of the mapped GUTI, which is generated from the P-TMSI and RAI.

3) When the UE is attached for emergency bearer services but is not registered in the tracking area of the current cell during the NAS signaling connection establishment, the UE NAS shall provide the lower layers with the S-TMSI.

Figure 5:
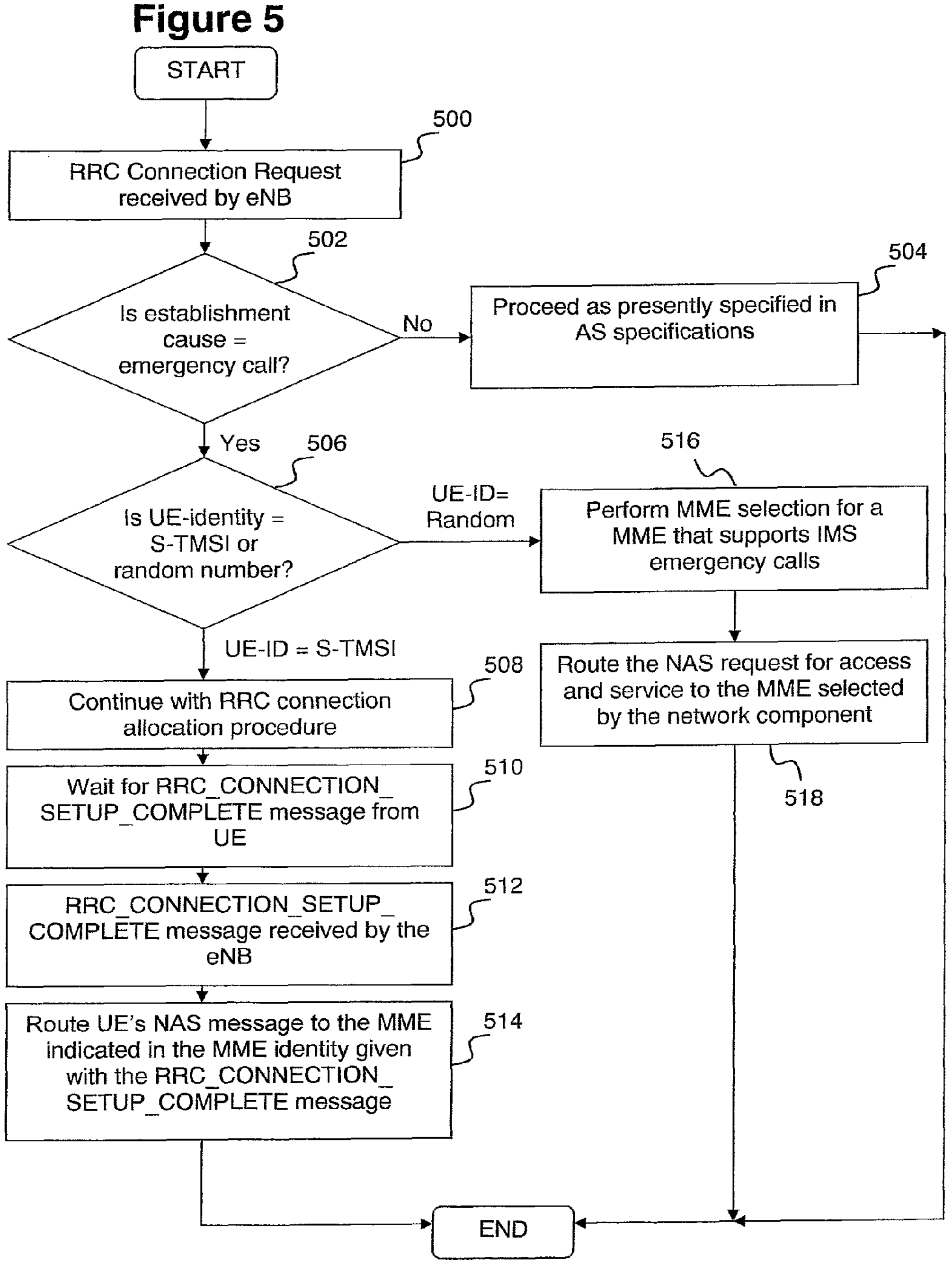
FIG. 5 is a flowchart of a network component procedure for detection of a UE ID when a UE accesses a network component for services, according to an embodiment of the present disclosure.

FIG. 5 is a flowchart of a network component procedure for detection of a UE ID when a UE accesses a network component for services, according to an embodiment of the present disclosure. The process shown in FIG. 5 reflects a similar embodiment described with respect to FIG. 4. However, FIG. 4 reflected the UE side of the embodiment, whereas FIG. 5 reflects the network component side of the embodiment. The process shown in FIG. 5 may be implemented in a communications network such as those shown in FIGS. 1-3. The process shown in FIG. 5 may be implemented using a network component, such as those described in FIGS. 1-3 and FIG. 14. The process shown in FIG. 5 may be used to address the issues described above.

The process begins as the network component, which may be an eNB or some other component, receives a RRC_CONNECTION_REQUEST message (block 500). The network component then determines whether the establishment cause is set to "emergency call" (block 502). If not, then the network component proceeds as originally specified in the AS specifications (block 504). The process terminates thereafter.

However, if the establishment cause is set to "emergency call," a "yes" determination to block 502, then the network component determines if the UE-identity is equal to the S-TMSI or to a random number (block 506). If the UE ID is set to the 5-TMSI, then the network component continues with the RRC connection allocation procedure (block, 508). The network component waits for a RRC_CONNECTION_SETUP_COMPLETE message from the UE (block 510), and then subsequently receives the RRC_CONNECTION_SETUP_COMPLETE message (block 512). The network component then routes the UE's NAS message to the MME indicated in the MMEI given with the RRC_CONNECTION_SETUP_COMPLETE message (block 514). The process terminates thereafter. The combination of testing the S-TMSI availability and then routing to the indicated MME when the establishment cause is set to "emergency call" is one of the several embodiments described herein that may be used to address the issues described above.

Returning to block 506, if the UE ID is set to a random number, then the network component performs MME selection for a MME that supports IMS emergency calls (block 516). The network component then routes the NAS request for access and service to the MME selected by the network component (block 518). The process terminates thereafter.

The following presents a summary and additional details regarding network component behavior with respect to the embodiment described with respect to FIG. 5. If the network component receives an RRC_CONNECTION_REQUEST message from a UE with the establishment cause set to "emergency call," and the "UE Identity" set to a random value, then the network component may route the connection to any MME that supports emergency calls. If the network component receives an RRC_CONNECTION_REQUEST message from a UE with the establishment cause set to "emergency call," and the "UE Identity" set to an S-TMSI value, then the network component may route the connection to the MME indicated by the registered MME field within the RRC_CONNECTION_SETUP_COMPLETE message. The registered MME may take the form of a GUMMEI, or MMEI, MMEC, or some other form.

Note that if the UE actually does a TAU in a TA that is no longer covered by the MME, the UE may be registered in such a manner that may result in a problematic behavior, as described above. That is, should a NAS message reach a MME that has no context for the UE that sends the NAS message, then a subsequent call may be dropped or might not be able to be established. However, if the NAS message is a TAU that will result in context retrieval from a previous serving MME to a new target MME, the NAS session may likely continue. For any other NAS messages, a NAS level failure may occur and there may be a recovery required at the NAS level. However, a UE in IDLE mode that is physically moving far enough to be out of its registered MME group, while attached for emergency bearer services, would attempt a TAU before attempting any other NAS signaling procedures.

Figure 6:
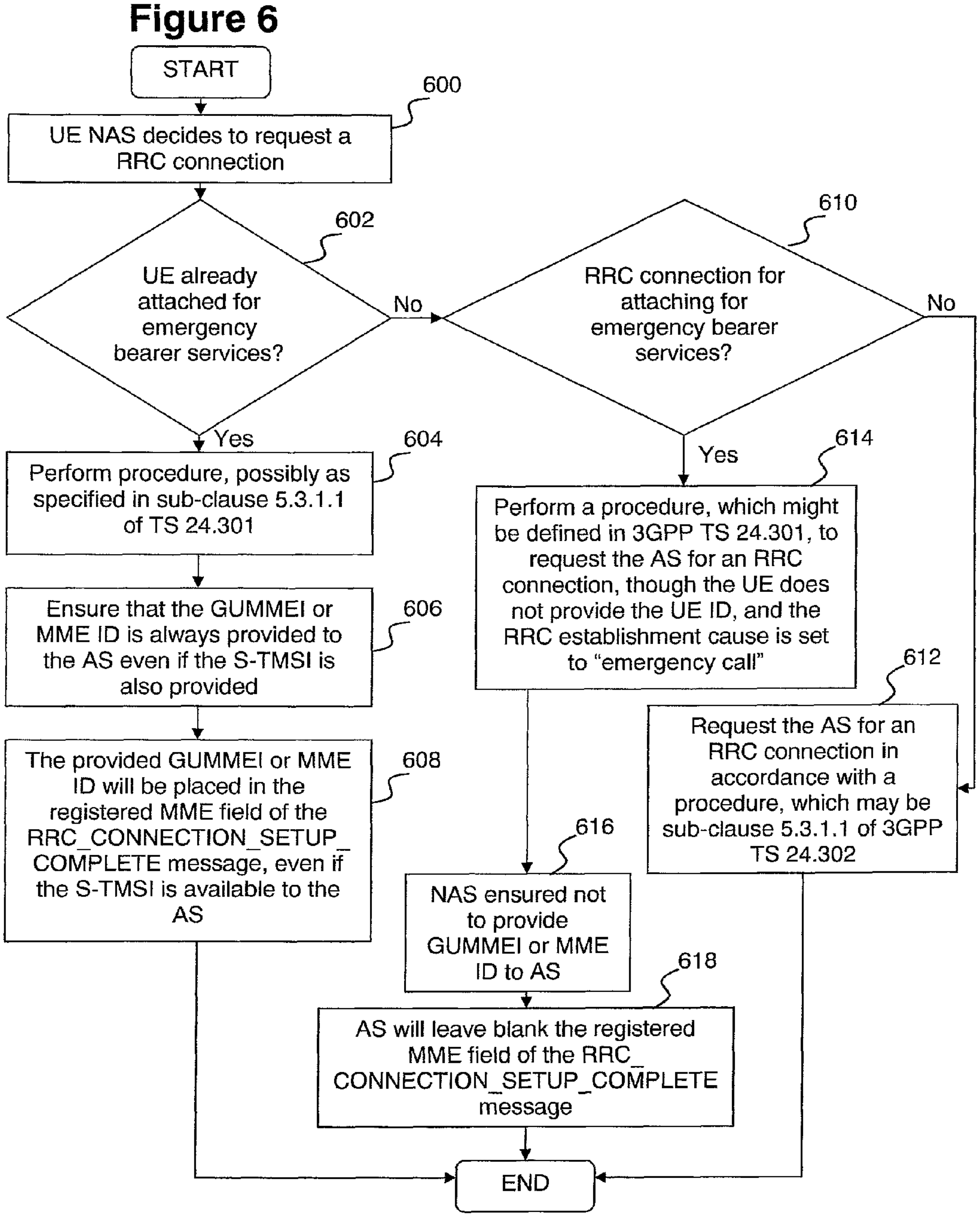
FIG. 6 is a flowchart of a UE procedure for provision of a MMEI or GUMMEI while attached for emergency bearer services, according to an embodiment of the present disclosure.

FIG. 6 is a flowchart of a UE procedure for provision of a MMEI or GUMMEI while attached for emergency bearer services, according to an embodiment of the present disclosure. The process shown in FIG. 6 may be implemented in a communications network such as those shown in FIGS. 1-3. The process shown in FIG. 6 may be implemented using a UE, such as those described in FIGS. 1-3 and FIG. 14. The process shown in FIG. 6 may be used to address the issues described above.

The process begins as the UE NAS decides to request an RRC connection (block 600). The UE then determines whether the UE is already attached for emergency bearer services (block 602). If so, then the UE will perform the procedure, which in an embodiment may be specified in sub-clause 5.3.1.1 of 3GPP TS 24.301 (block 604). However, some other procedure could also be used. The UE then may ensure that the GUMMEI or MME ID is always provided to the AS, even if the S-TMSI is also provided (block 606). The provided GUMMEI or MME ID may be placed in the registered MME field of the RRC_CONNECTION_SETUP_COMPLETE message, even if the S-TMSI is available to the AS (block 608). The process terminates thereafter.

Returning to block 602, if the UE is not attached for emergency bearer services, a "no" determination to block 602, then the UE determines whether the RRC connection is for attaching for emergency bearer services or an IMS emergency session (block 610). If not, then the UE requests the AS for an RRC connection in accordance with a procedure, which in an embodiment may be sub-clause 5.3.1.1 of 3GPP TS 24.302 (block 612). However, some other procedure could be used. The process terminates thereafter.

Returning to block 610, if the RRC connection is for attaching for emergency bearer services, a "yes" determination to block 610, then the UE performs a procedure, which might be defined in 3GPP TS 24.301, to request the AS for an RRC connection, though the UE does not provide the UE ID, and the RRC establishment cause is set to "emergency call" (block 614). However, some other procedure could be used. The UE NAS then is ensured not to provide the GUMMEI or MME ID to the AS (block 616). The AS will leave blank the registered MME field of the RRC_CONNECTION_SETUP_COMPLETE message (block 618). The process terminates thereafter.

The following provides a summary and provides additional details regarding the embodiment described with respect to FIG. 6, which relates to provisioning of the MMEI or GUMMEI while attached for emergency bearer services. Currently, a UE may be in limited service state when initiating an IMS emergency call. Such a UE may specify in the RRC_CONNECTION_REQUEST message a UE ID set to a random number, and an establishment cause set to "emergency call."

However, when requesting a RRC connection the first time to support an IMS emergency session, the RegisteredMME field may be deliberately left empty, not provided, or indicated as being invalid. The RegisteredMME field may be within the RRC_CONNECTION_SETUP_COMPLETE message sent at the end of the three-way handshake, such as shown in FIG. 2.

For a subsequent request for RRC connection, after the first RRC connection has been released and while UE is still attached for emergency bearer services, the UE NAS may provide a valid MME ID in the form of a MMEI or a GUMMEI. With this MME ID, the AS of the UE may, in the RRC_CONNECTION_SETUP_COMPLETE message, provide that MMEI or the GUMMEI in the RegisteredMME field.

The network component may still check if the UE ID is set to a random number, but may also check if the RegisteredMME field exists or is valid. If the RegisteredMME field does not exist or is not valid, then the network component may perform MME selection. If the RegisteredMME field does exist and is valid, then the eNB might not perform MME selection, but rather route the call towards the indicated MME in the RegisteredMME field.

In an embodiment, there might be assumed that each network component has a list of MMEI for the MMEs the corresponding network component can work with, or the MMEs that the network components can establish a S1 connection with. Thus, as may be the case with the embodiments described with respect to FIG. 4 and FIG. 6, possibly a GUMMEI or an MMEI might be provided in the RegisteredMME field but the field's content may not identify a MME that the network component knows. Such a case may occur if the UE has moved to a location within the network in which service is provided by a different set or different pool of MMEs. In such a case, the network component may perform a MME selection among the MMEs that the network component knows. The resultant selected MME may be a different MME from the one with which the UE was previously registered. Thus, a reallocation of the serving MME may occur. When the network component performs the MME selection among the MMEs that it knows, the network component may select an MME that belongs to the same PLMN as indicated in the PLMN identity portion of the GUMMEI. Alternatively, the network component may select an MME that belongs to the PLMN indicated by the selected PLMN identity field within the RRC Connection Setup Complete message. If the network component were to select an MME of a PLMN different from the PLMN to which the UE is attached for emergency bearer services, then a failure of the TAU may likely result.

In an alternative embodiment, a single value of a range of PLMN IDs, or reserved range of MCC MNCs, may be reserved. In this case, the reserved values may indicate that a given PLMN ID is not a real, deployable PLMN ID.

Summarizing the embodiment described with respect to FIG. 6, if the UE is not attached for emergency bearer services and the UE is requesting an RRC Connection in order to perform an attach for emergency bearer services, then the UE may send, within the RRC_CONNECTION_REQUEST message one or more of the following pieces of information. First, the UE may send a UE Identity that is set to a random value. Second, the UE may send an establishment cause that is set to "emergency call." In an embodiment, the UE does not include a registered MME ID within the RRC_CONNECTION_SETUP_COMPLETE message.

If the UE is attached for emergency bearer services and the UE is requesting an RRC Connection, then the UE sends, within the RRC_CONNECTION_REQUEST message one or more of the following pieces of information. First, the UE may send a UE Identity that is set according to current 3GPP specifications, or by some other method. Second, the UE may send an establishment cause that is set to "emergency call." Within the RRC_CONNECTION_SETUP_COMPLETE message the UE also may include a registered MME identity received from the network when the UE performed the attach procedure for emergency bearer services.

A variant of the embodiment described with reference to FIG. 6 may be implemented at the portion of the procedure indicated at block 606. In this variation, the NAS may provide the AS with the S-TMSI, but not the GUMMEI nor MMEI, if the UE is registered in the TA of the current cell. The NAS may also provide the AS with the GUMMEI or MMEI, but not the S-TMSI, if the UE is not registered in the TA of the current cell. Correspondingly, at block 608, if the S-TMSI is made available to the AS, then the S-TMSI may be placed in the RRC_CONNECTION_REQUEST message. If the GUMMEI or MMEI is made available to the AS, then the GUMMEI may be placed in the registered MME field of the RRC_CONNECTION_SETUP_COMPLETE message.

Figure 7:
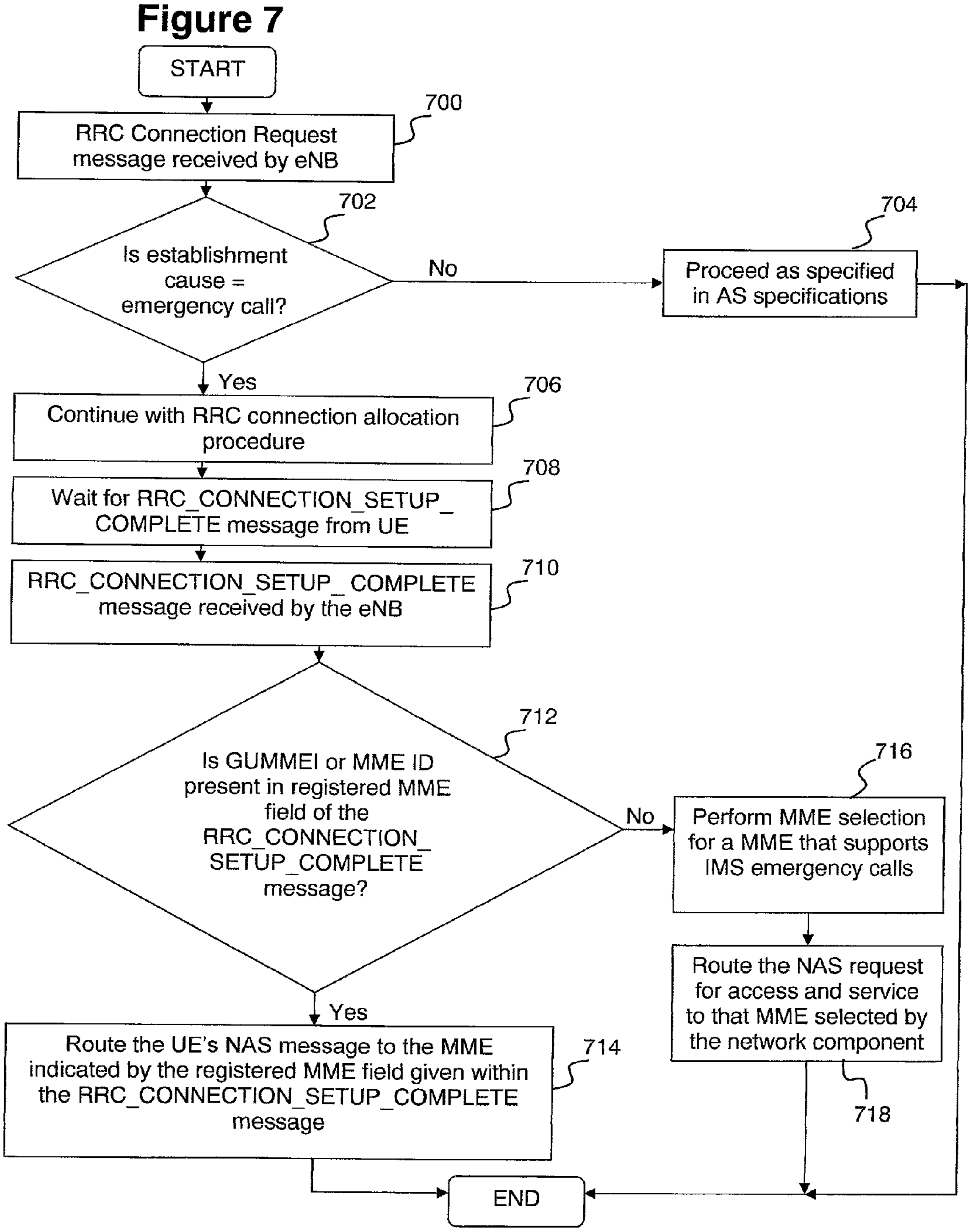
FIG. 7 is a flowchart of a network component procedure for detection of MMEI or GUMMEI in a network component, according to an embodiment of the present disclosure.

FIG. 7 is a flowchart of a network component procedure for detection of MMEI or GUMMEI in a network component, according to an embodiment of the present disclosure. The process shown in FIG. 7 reflects a similar embodiment described with respect to FIG. 6. However, FIG. 6 reflected the UE side of the embodiment, whereas FIG. 7 reflects the network component side of the embodiment. The process shown in FIG. 7 may be implemented in a communications network such as those shown in FIGS. 1-3. The process shown in FIG. 7 may be implemented using a network component, such as those described in FIGS. 1-3 and FIG. 14. The process shown in FIG. 7 may be used to address the issues described above.

The process begins as the RRC_CONNECTION_REQUEST message is received by the network component (block 700). The network component determines whether the establishment cause is set to "emergency call" (block 702). If not, then the network component proceeds as provided in the AS specifications (block 704). The process terminates thereafter.

However, if the establishment cause is set to "emergency call," a "yes determination to block 702, then the network component may continue with the RRC connection allocation procedure (block 706). The network component waits for the RRC_CONNECTION_SETUP_COMPLETE message from the UE (block 708), and then receives the RRC_CONNECTION_SETUP_COMPLETE message (block 710).

The network component then determines whether the GUMMEI or MME ID is present in the registered MME field of the RRC_CONNECTION_SETUP_COMPLETE message (block 712). If so, then the network component routes the UE's NAS message to the MME indicated by the registered MME field given within the RRC_CONNECTION_SETUP_COMPLETE message (block 714). The process terminates thereafter. If not, then the network component may perform a MME selection for a MME that supports IMS emergency calls (block 716). The network component may then route the NAS request for access and service to the network component-selected MME (block 718). The process terminates thereafter.

The following provides a summary and provides additional details regarding the process described above with respect to FIG. 7. If the network component receives an RRC_CONNECTION_REQUEST message with an establishment cause set to "emergency call" and the RRC_CONNECTION_SETUP_COMPLETE message does not contain a registered MME identity, then the network component may route the NAS request/message to any MME that support emergency calls. If the network component receives an RRC_CONNECTION_REQUEST message with an establishment cause set to "emergency call" and the RRC_CONNECTION_SETUP_COMPLETE message contain a registered MME identity, then the network component may route the NAS request/message to the MME indicated by the registered MME field in the RRC_CONNECTION_SETUP_COMPLETE message.

A variant of the embodiment described with reference to FIG. 7 may be implemented at the portion of the procedure indicated at block 712. In this embodiment, the network component may determine whether S-TMSI is present in the RRC_CONNECTION_REQUEST message, and may further determine whether the GUMMEI or MME ID is present in the registered MME field of the RRC_CONNECTION_SETUP_COMPLETE message. If both the S-TMSI and GUMMEI or MME ID are absent, then the network component may perform a MME selection for a MME that supports IMS emergency calls (block 716). If either the S-TMSI is present or the GUMMEI or MME ID is present then, as a variant to the procedure indicated at block 714, the network component may route the NAS message to the MME indicated by the registered MME field, if the GUMMEI or MME ID are present within the RRC_CONNECTION_SETUP_COMPLETE message. Alternatively, the network component may route the NAS message to the MME indicated by the MMEC portion of the S-TMSI, if the GUMMEI or MME ID are present within in the RRC CONNECTION_SETUP_REQUEST message.

Figure 8:
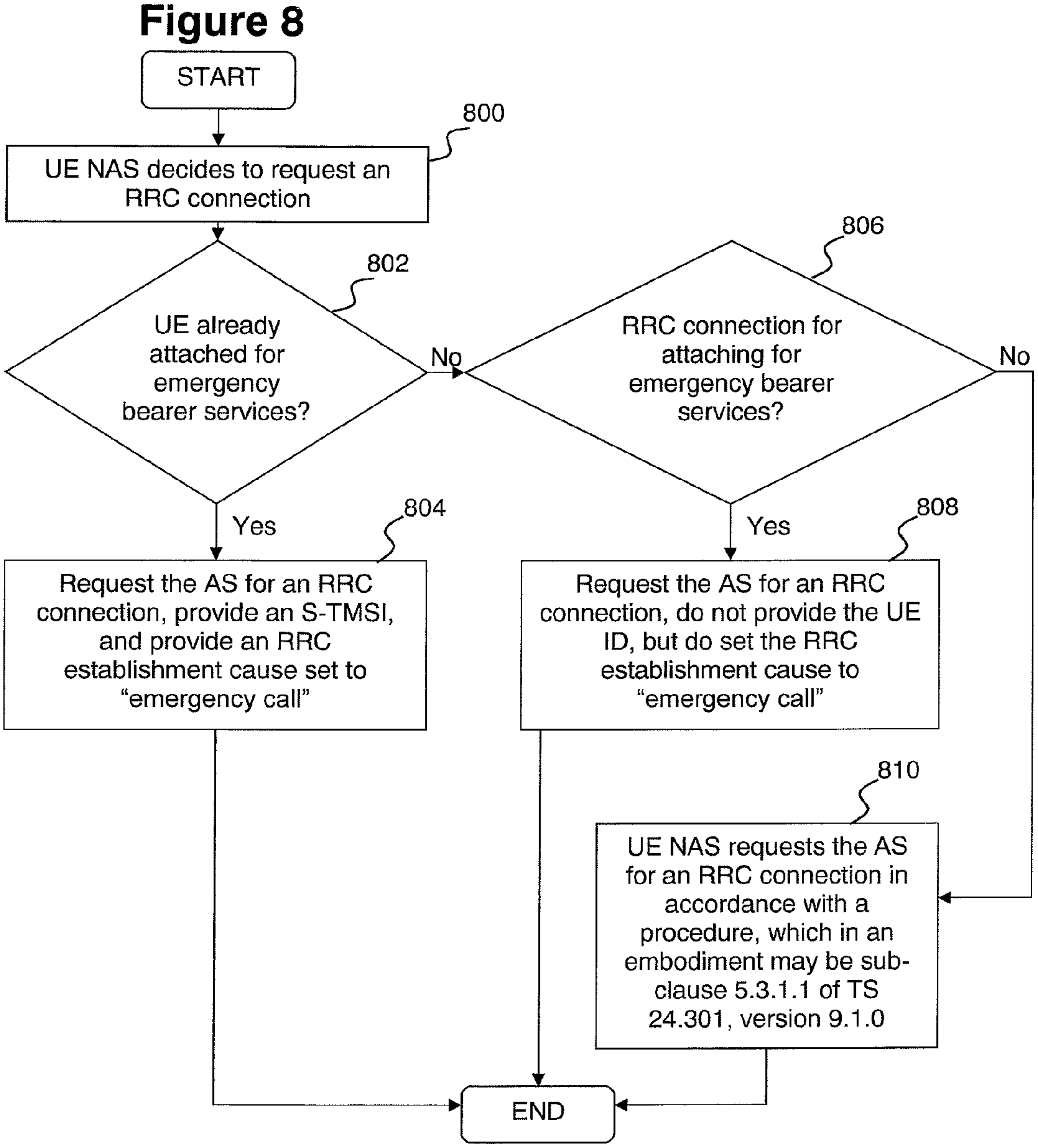
FIG. 8 is a flowchart of a UE procedure for provision of an S-TMSI that can identify the registered MME when attached for emergency bearer services, according to an embodiment of the present disclosure.

FIG. 8 is a flowchart of a UE procedure for provision of an S-TMSI that can identify the registered MME while attached for emergency bearer services, according to an embodiment of the present disclosure. The process shown in FIG. 8 may be implemented in a communications network such as those shown in FIGS. 1-3. The process shown in FIG. 8 may be implemented using a UE, such as those described in FIGS. 1-3 and FIG. 14. The process shown in FIG. 8 may be used to address the issues described above.

The process begins as the UE NAS decides to request an RRC connection (block 800). The UE then decides whether the UE is already attached for emergency bearer services (block 802). If so, then the UE requests the AS for an RRC connection, provides an S-TMSI, and provides an RRC establishment cause set to "emergency call" (block 804). The process terminates thereafter. If not, then the UE determines whether the RRC connection is for attaching for emergency bearer services (block 806).

If the RRC connection is for attaching for emergency bearer services, then the UE requests the AS for an RRC connection, does not provide the UE ID, but does set the RRC establishment cause to "emergency call" (block 808). The process terminates thereafter. However, if the RRC connection is not for attaching for emergency bearer services, then the UE NAS requests the AS for an RRC connection in accordance with a procedure, which in an embodiment may be sub-clause 5.3.1.1 of TS 24.301, version 9.1.0 (block 810). However, other procedures could be used. The process terminates thereafter.

The following provides a summary and additional details of the embodiment described with respect to FIG. 8, which relates to provision of an S-TMSI that can identify the registered MME while the UE is attached for emergency bearer services. The embodiment described in FIG. 8 may be considered a variation or alternative embodiment to those described with respect to FIG. 4 and FIG. 6.

In embodiment described with respect to FIG. 4, the S-TMSI may be provided by the NAS when requesting RRC connection, if NAS is already attached for emergency bearer services. In the embodiments described with respect to FIG. 4 and FIG. 6, the GUMMEI, MMEI, or MMEC may be provided to a network component in the RRC_CONNECTION_SETUP_COMPLETE message. The GUMMEI, MMEI, or MMEC may then be used by the network component, under the circumstances described above, to determine the MME to which the NAS message should be forwarded.

In the embodiment described with respect to FIG. 8, the network component may alternatively use the MMEC part of the S-TMSI that is provided in the RRC_CONNECTION_ REQUEST message to determine the MME to which the NAS message should be forwarded. Note that the MMEC may be unique within a pool of MMEs or MME group. In other words, within a group of MMEs, identified by a MMEGI, the MMEC may be unique. However, the MMEC may not be globally unique. If the UE has physically moved to an area managed by another MME group, then the network component may apply the MMEC to determine the MME to which the NAS message may be forwarded. In this case, the NAS message might be forwarded to the wrong MME, if the MMEC is also valid for that network component. However, if that NAS message is a TAU that will result in context retrieval from a previous serving MME to the new target MME, the NAS session will likely continue. For any other NAS messages, a NAS level failure might occur. Nevertheless, a UE in IDLE mode having emergency bearers is not likely to physically move so far that the UE is out of its registered MME group, wherein the UE also did not attempt a TAU before attempting any other NAS signaling procedures.

Figure 9:
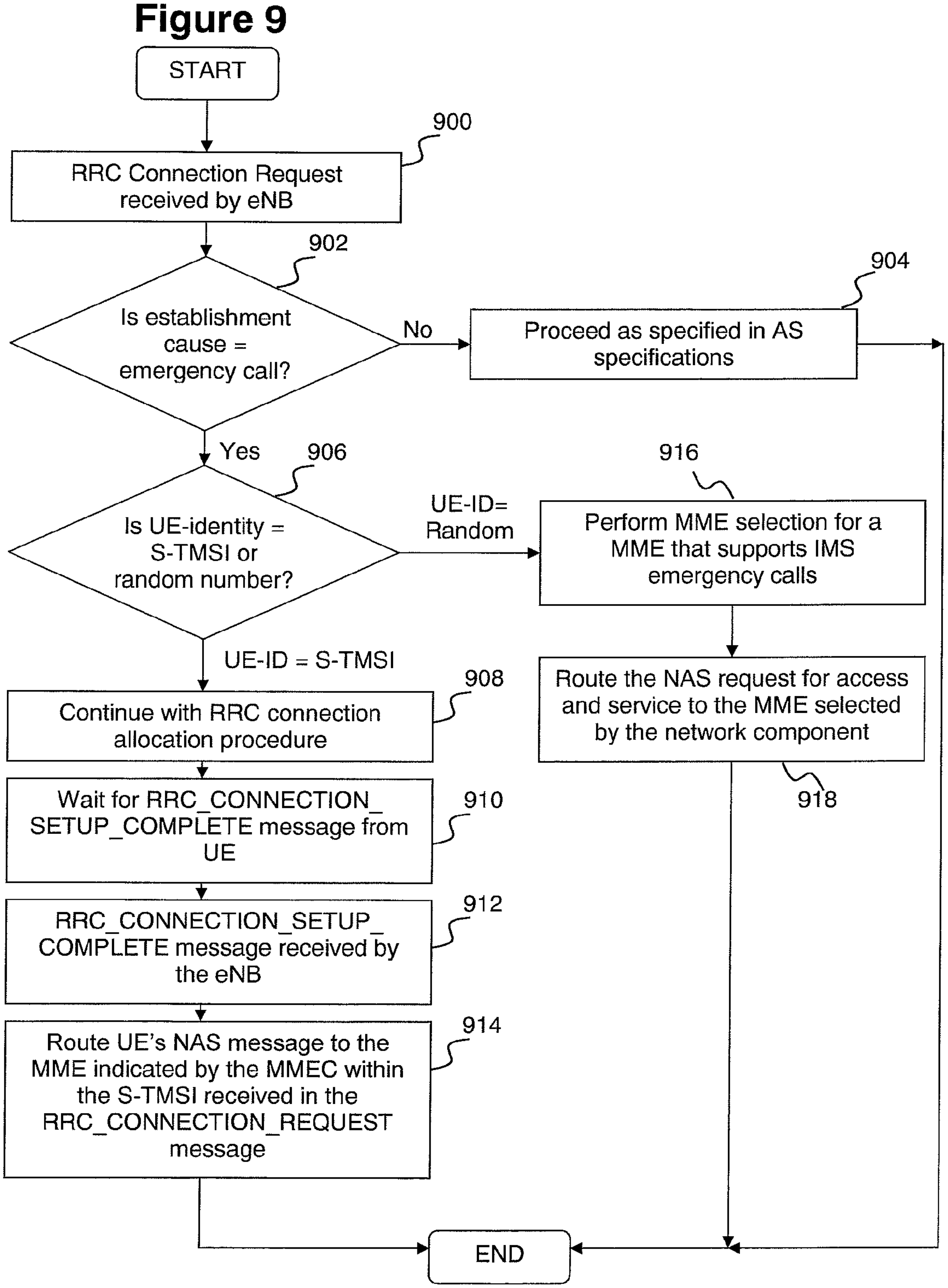
FIG. 9 is a flowchart of a network component procedure for detection of the registered MME from the S-TMSI in a network component, according to an embodiment of the present disclosure.

FIG. 9 is a flowchart of a network component procedure for detection of the registered MME from the S-TMSI in a network component, according to an embodiment of the present disclosure. The process shown in FIG. 9 reflects a similar embodiment described with respect to FIG. 8. However, FIG. 8 reflected the UE side of the embodiment, whereas FIG. 9 reflects the network component side of the embodiment. The process shown in FIG. 9 may be implemented in a communications network such as those shown in FIGS. 1-3. The process shown in FIG. 9 may be implemented using a network component, such as those described in FIGS. 1-3 and FIG. 14. The process shown in FIG. 9 may be used to address the issues described above.

The process begins as the network component receives the RRC_CONNECTION_REQUEST message (block 900). The network component then determines whether the establishment cause is set to "emergency call" (block 902).

If not, then the network component may proceed as specified in the AS specifications (block 904). The process terminates thereafter.

If the establishment cause is set to "emergency call," then the network component determines whether the UE ID is set to the S-TMSI or to a random number (block 906). If the UE ID is set to the S-TMSI, then the network component continues with the RRC connection allocation procedure (block 908). The network component waits for the RRC_CONNECTION_SETUP_COMPLETE message from the UE (block 910) and then receives the RRC_CONNECTION_SETUP_COMPLETE message (block 912). The network component then routes the UE's NAS message to the MME indicated by the MMEC within the S-TMSI received in the RRC_CONNECTION_REQUEST message (block 914). The process terminates thereafter.

Returning to block 906, if the UE ID is set to a random number, then the network component performs MME selection for a MME that supports IMS emergency calls (block 916). The network component then routes the NAS request for access and service to the network component-selected MME (block 918). The process terminates thereafter.

Figure 10:
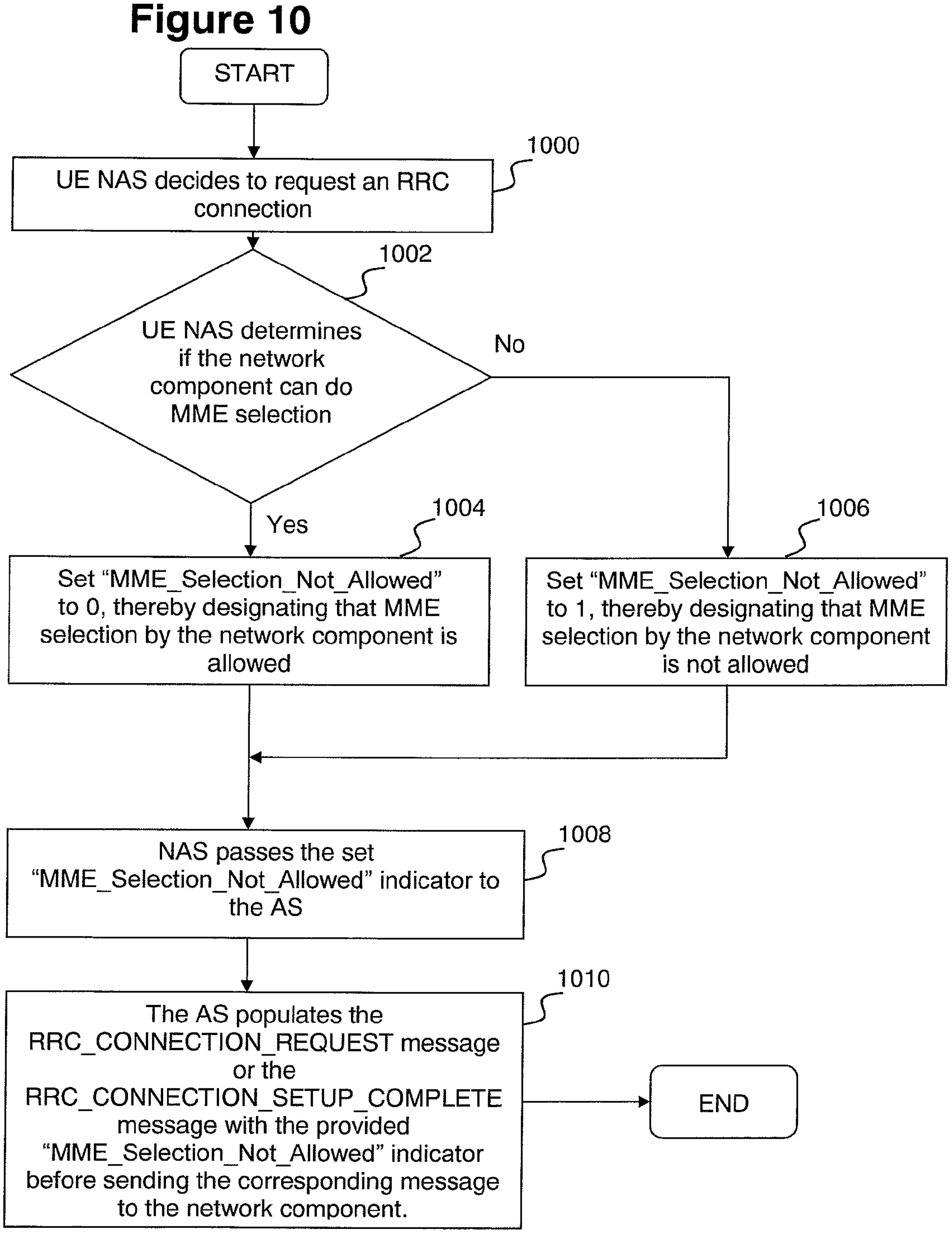
FIG. 10 is a flowchart of a UE procedure for determining if MME selection by an eNB is allowed, and providing that determination in an indicator, according to an embodiment of the present disclosure.

FIG. 10 is a flowchart of a UE procedure for determining if MME selection by an eNB is allowed, and providing that determination in an indicator, according to an embodiment of the present disclosure. The process shown in FIG. 10 may be implemented using a UE, such as those described in FIGS. 1-3 and FIG. 14. The process shown in FIG. 10 may be used to address the issues described above.

The process begins with the NAS of the UE deciding to request an RRC connection (block 1000). The UE NAS then decides if, for this RRC connection being requested, whether the network component can make a MME selection independently (block 1002). The term "independently" or "independent MME selection" means that the network component can make an MME selection that is not constrained by the techniques disclosed herein. If independent MME selection is not allowed, an instruction that may be communicated by the indicator described below, then the network component is constrained not to select an MME except as provided in some rule, such as in some data provided by the UE that indicates which MME should be selected.

Returning to block 1002, in response to a "yes" determination, then the NAS may set an indicator to zero, thereby indicating that the network component can perform the MME selection (block 1004). This indicator may be, for example, termed the "MME_Selection_Not_Allowed" indicator. If this indicator is set to 1 (a "no" determination at clock 1002), then the network component is not allowed to make an MME selection for the NAS message (block 1006), which consequently may be transported as part of the RRC connection establishment procedure. Note that the values of "1" and "0" might be reversed, and this determination may be made and/or indicated using any convenient procedure.

Regardless of how the indicator is set (either a "yes" or "no" determination to the decision shown at block 1002), the NAS then passes the indicator to the AS (block 1008). The AS provides the indicator to the network component as part of the RRC connection establishment procedure, such as in either of RRC CONNECTION REQUEST message or RRC CONNECTION SETUP COMPLETE message (block 1010). The process terminates thereafter.

Figure 11:
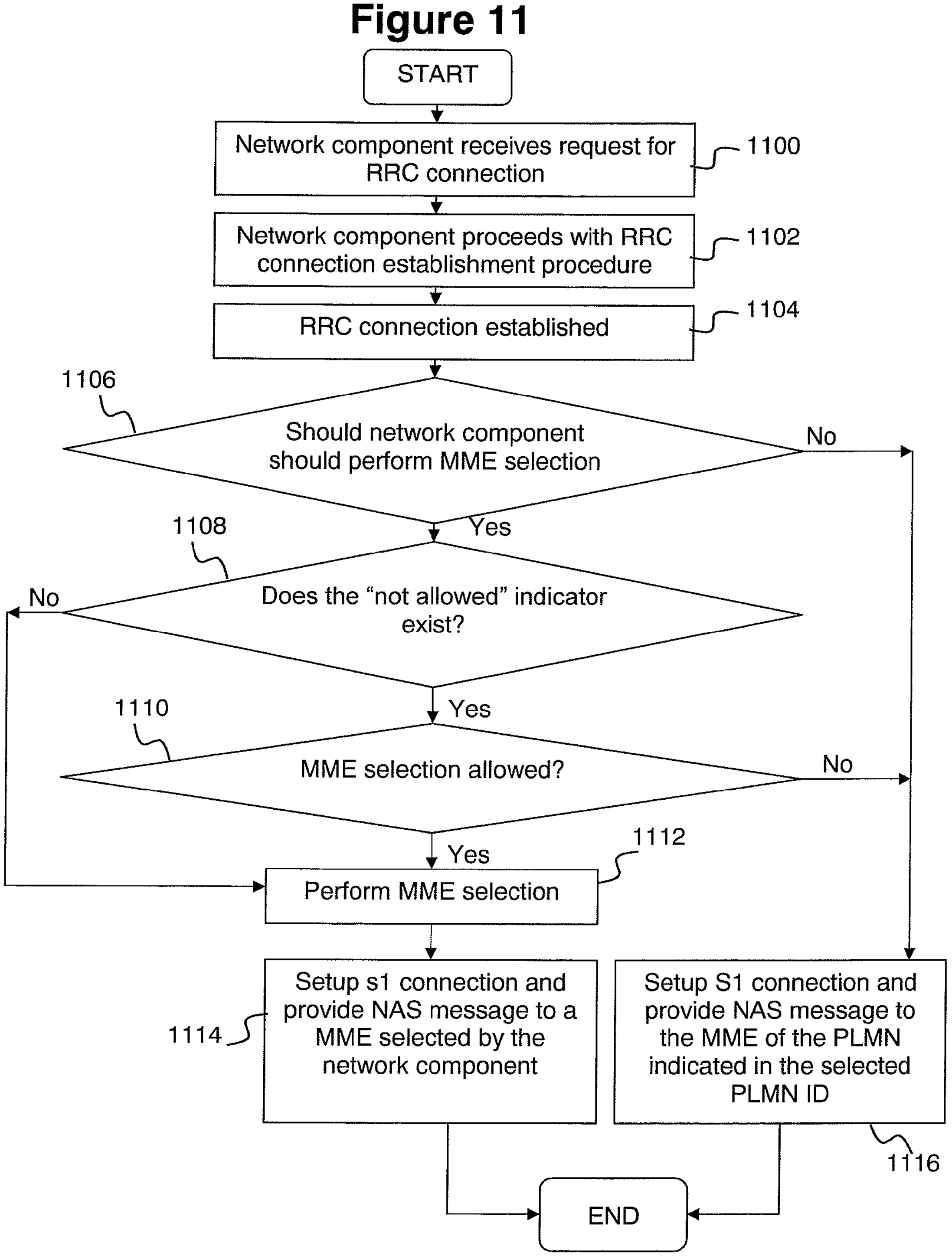
FIG. 11 is a flowchart of a network component procedure for processing an indicator of allowed MME selection, according to an embodiment of the present disclosure.

FIG. 11 is a flowchart of a network component procedure for processing an indicator of allowed MME selection, according to an embodiment of the present disclosure. The process shown in FIG. 11 may be implemented using a network component, such as those described in FIGS. 1-3 and FIG. 14. The process shown in FIG. 11 may be used to address the issues described above.

The process begins with the network component receiving a request for a RRC connection (block 1100). The network component proceeds with the RRC connection establishment (block 1102) and completes the RRC connection establishment (block 1104).

Upon completion of the RRC connection establishment procedure, the network component checks if the network component should perform MME selection (block 1006). This procedure may be performed by checking for the existence of random number and an establishment cause equaling "emergency call," or the procedure may be decided by some other network component. Other checks may be possible.

If, as a result of these checks, the network component determines that the network component should perform MME selection (a "yes" determination at block 1106), the network component further checks if a "not allowed" indicator exists (block 1108). The "not allowed" indicator may be provided by the UE. The "not allowed" indicator may be referred to as a "MME_Selection_Not_Allowed," but may have any convenient name. In alternative embodiments, the "not allowed" indicator may be an "allowed" indicator, and the process modified accordingly. If the network component finds that the "not allowed" indicator is present (a "yes" determination at block 1108), then the network component determines whether MME selection is allowed based on the "not allowed" indicator (block 1110).

If the MME selection is allowed (a "yes" determination at block 1110) or if the "not allowed" indicator does not exist or is invalid (a "no" determination at block 1108), then the network component proceeds with performing MME selection (block 1112). Thereafter, the network component sets up the S1 connection and provides the NAS message to a MME selected by the network component (block 1114). In alternative embodiments, different types of connections may be established. The process terminates thereafter.

Returning to blocks 1106 and 1110, if a decision is made that the network component should not perform MME selection (a "no" determination at block 1106) or if MME selection is not allowed (a "no" determination at block 1110), then the network component sets up a S1 connection and provides the NAS message to the MME of the CN or PLMN indicated in the selected CN ID or PLMN ID (block 1116). In alternative embodiments, different types of connections may be established. The process terminates thereafter.

Figure 12:
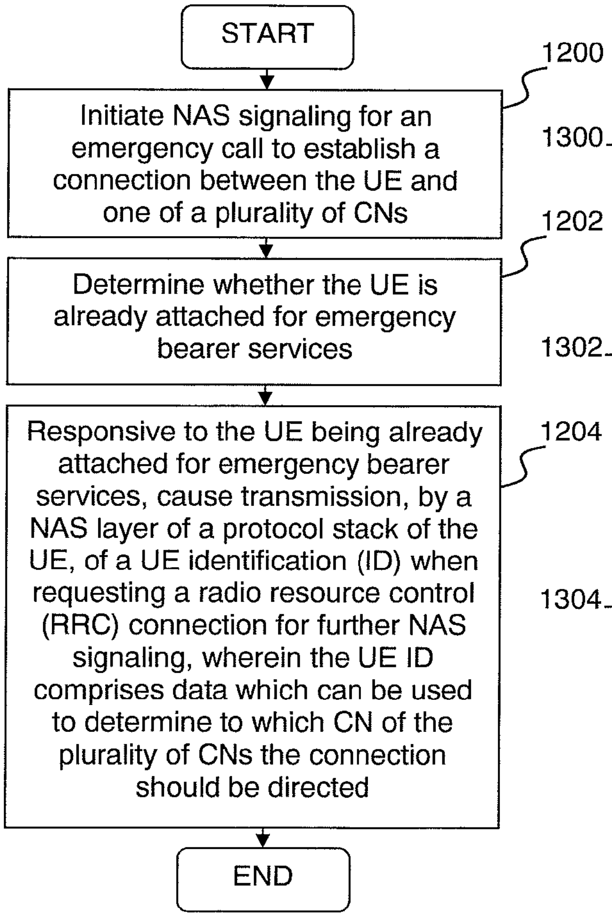
FIG. 12 is a flowchart of a procedure for routing NAS messages by a UE, according to an embodiment of the present disclosure.

FIG. 12 is a flowchart of a procedure for routing NAS messages by a UE, according to an embodiment of the present disclosure. The process shown in FIG. 12 may be implemented using a UE, such as those described in FIGS. 1-3 and FIG. 14. The process shown in FIG. 12 may be used to address the issues described above.

The process begins as the UE initiates or performs NAS signaling for an emergency call to establish a connection between the UE and one of a plurality of CNs (block 1200). The UE then determines whether the UE is already attached for emergency bearer services (block 1202). Responsive to the UE being already attached for emergency bearer services, the UE causes transmission, by a NAS layer of a protocol stack of the UE, of a UE identification (ID) when requesting a radio resource control (RRC) connection for further NAS signaling, wherein the UE ID comprises data which can be used to determine to which CN of the plurality of CNs the connection should be directed (block 1204). The process terminates thereafter.

Figure 13:
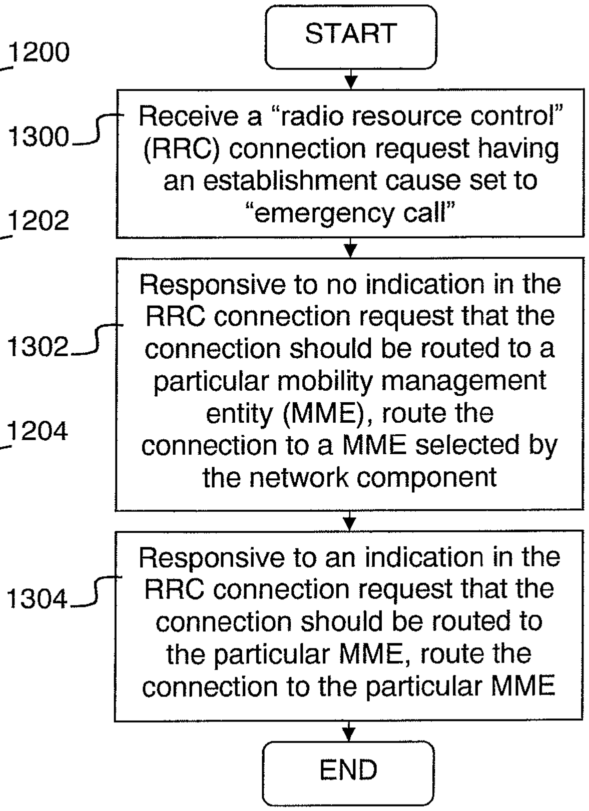
FIG. 13 is a flowchart of a procedure for routing NAS messages by a network component, according to an embodiment of the present disclosure.

FIG. 13 is a flowchart of a procedure for routing NAS messages by a network component, according to an embodiment of the present disclosure. The process shown in FIG. 13 may be implemented using a network component, such as those described in FIGS. 1-3 and FIG. 14. The process shown in FIG. 13 may be used to address the issues described above.

The process begins as the network component receives a "radio resource control" (RRC) connection request having an establishment cause set to "emergency call" (block 1300). Responsive to no indication in the RRC connection request that the connection should be routed to a particular mobility management entity (MME), the network component routes the connection to a MME selected by the network component (block 1302). Responsive to an indication in the RRC connection request that the connection should be routed to the particular MME, the network component routes the connection to the particular MME (block 1304). The process terminates thereafter.

The UE and other components described above might include processing and other components that alone or in combination are capable of executing instructions or otherwise able to promote the occurrence of the actions described above. FIG. 14 illustrates an example of a system 1400 that includes a processing component, such as processor 1410, suitable for implementing one or more embodiments disclosed herein. In addition to the processor 1410 (which may be referred to as a central processor unit or CPU), the system 1400 might include network connectivity devices 1420, random access memory (RAM) 1430, read only memory (ROM) 1440, secondary storage 1450, and input/output (I/O) devices 1460. These components might communicate with one another via a bus 1400. In some cases, some of these components may not be present or may be combined in various combinations with one another or with other components not shown. These components might be located in a single physical entity or in more than one physical entity. Any actions described herein as being taken by the processor 1410 might be taken by the processor 1410 alone or by the processor 1410 in conjunction with one or more components shown or not shown in the drawing, such as a digital signal processor (DSP) 1480. Although the DSP 1480 is shown as a separate component, the DSP 1480 might be incorporated into the processor 1410.

The processor 1410 executes instructions, codes, computer programs, or scripts that it might access from the network connectivity devices 1420, RAM 1430, ROM 1440, or secondary storage 1450 (which might include various disk-based systems such as hard disk, floppy disk, or optical disk). While only one CPU 1410 is shown, multiple processors may be present. Thus, while instructions may be discussed as being executed by a processor, the instructions may be executed simultaneously, serially, or otherwise by one or multiple processors. The processor 1410 may be implemented as one or more CPU chips.

The network connectivity devices 1420 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1420 may enable the processor 1410 to communicate with the Internet or one or more telecommunications networks or other networks from which the processor 1410 might receive information or to which the processor 1410 might output information. The network connectivity devices 1420 might also include one or more transceiver components 1425 capable of transmitting and/or receiving data wirelessly.

The RAM 1430 might be used to store volatile data and perhaps to store instructions that are executed by the processor 1410. The ROM 1440 is a non-volatile memory device that typically has a smaller memory capacity than the memory capacity of the secondary storage 1450. ROM 1440 might be used to store instructions and perhaps data that are read during execution of the instructions. Access to both RAM 1430 and ROM 1440 is typically faster than to secondary storage 1450. The secondary storage 1450 is typically comprised of one or more disk drives or tape drives and might be used for non-volatile storage of data or as an over-flow data storage device if RAM 1430 is not large enough to hold all working data. Secondary storage 1450 may be used to store programs that are loaded into RAM 1430 when such programs are selected for execution.

The I/O devices 1460 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1425 might be considered to be a component of the I/O devices 1460 instead of or in addition to being a component of the network connectivity devices 1420.

Thus, the embodiments provide for a method implemented in a user equipment (UE). Non-access stratum (NAS) signaling is initiated in order to establish a connection between the UE and one of a plurality of core network elements. A determination is made whether the UE is already attached for emergency bearer services. Responsive to the UE being already attached for emergency bearer services, transmission is caused, by a NAS layer of a protocol stack of the UE, of a UE identification (ID) when requesting a radio resource control (RRC) connection for further NAS signaling, wherein the UE ID comprises data which can be used to determine to which CN of a plurality of CNs the connection should be directed. The embodiments also provide for a UE configured to perform these functions.

The embodiments also provide for a method implemented in a network component, the method for routing a non-access stratum layer (NAS). A "radio resource control" (RRC) connection request is made, the RRC connection request having an establishment cause set to "emergency call." Responsive to no indication in the RRC connection request that the connection should be routed to a particular mobility management entity (MME), the connection is routed to a MME selected by the network component. Responsive to an indication in the RRC connection request that the connection should be routed to the particular MME, the connection is routed to the particular MME. The embodiments also provide for a network component configured to perform these functions.

The embodiments also provide for a method implemented in a network component. A network connection request having an establishment cause set to "emergency call" is received. Responsive to no indication in the network connection request that the connection should be routed to a particular other network component or core network element, the connection is routed to an other network component or core network element selected by the network component. Responsive to an indication in the network connection request that the connection should be routed to the particular other network component or core network element, the connection is routed to the particular other network component or core network element. The embodiments also provide for a network component configured to implement these functions.

The embodiments also provide for a method implemented in a user equipment (UE). A decision is made to request access to a network. A determination is made whether a network component, to which access is made, should perform other network component or core network element selection. Responsive to a UE determination that the network component should not perform other network component or core network element selection, an indicator is provided, wherein the indicator comprises data that can indicate to the network component that the network component should not independently perform other network component or core network element selection. The embodiments also provide for a UE configured to implement these functions.

In another embodiment, a method implemented in a network component is provided comprising: receiving a network connection request having an establishment cause set to "emergency call;" responsive to no indication in the network connection request that the connection should be routed to a particular other network component or core network element, routing the connection to an other network component or core network element selected by the network component; and responsive to an indication in the network connection request that the connection should be routed to the particular other network component or core network element, routing the connection to the particular other network component or core network element. Wherein the other network component or core network element may comprise a mobility management entity (MMEI). Wherein the network connection request may contain "no indication" that the connection should be routed to a particular other network component or core network element when a user equipment (UE) identity (ID), received in the network connection request, is set to a random value. Wherein the indication that the connection should be routed to the particular other network component or core network element may comprise a user equipment (UE) identity (ID), received in the network connection request, being set to a "system architecture evolution temporary mobile subscriber identity" (S-TMSI) value. Wherein the network connection request may contain "no indication" that the connection should be routed to a particular other network component or core network element when a RRC_CONNECTION_SETUP_COMPLETE message either fails to contain a registered "mobility management entity identity" (MMEI) or contains an invalid MMEI. Wherein the indication that the connection should be routed to the particular other network component or core network element may comprise the RRC_CONNECTION_SETUP_COMPLETE message having a valid registered MMEI. Wherein the indication in the network connection request that the connection should be routed to the particular other network component or core network element may comprise using a "mobility management entity code" (MMEC) portion of a "system architecture evolution temporary mobile subscriber identity" (S-TMSI).

In another embodiment, a method implemented in a network component is provided, the method comprising receiving a request for a network connection, the request containing a message; establishing the network connection; determining whether the network component should perform selection of an other network component or core network element; responsive to a determination that the network component should not perform the selection, transmitting the message to a first other component or element, wherein the first component or element is specified in the message. Wherein the first other component or element may comprise a mobility management entity (MME). The method may further comprise responsive to a determination that the network component may perform the selection, independently selecting a component or element from among any available core network or public land mobile network; and transmitting the message to the selected component or element. Wherein transmitting the message may comprise transmitting a non-access stratum (NAS) message. Wherein determining whether the network component should perform the selection may comprise checking an indicator, wherein the indicator is contained in the message, and wherein the indicator indicates whether the selection is allowed.

In another embodiment, a network component is provided comprising a processor configured to allow the network component to receive a network connection request having an establishment cause set to "emergency call," responsive to no indication in the network connection request that the connection should be routed to a particular other network component or core network element, route the connection to an other network component or core network element independently selected by the network component, and responsive to an indication in the network connection request that the connection should be routed to the particular other network component or core network element, route the connection to the particular other network component or core network element. Wherein the processor may be further configured to route the connection to the other network component or core network element by routing the connection to a mobility management entity (MME). Wherein the network connection request may contain "no indication" that the connection should be routed to a particular other network component or core network element when a user equipment (UE) identity (ID), received in the network connection request, is set to a random value. Wherein the indication that the connection should be routed to the particular other network component or core network element may comprise a user equipment (UE) identity (ID), received in the network connection request, being set to a "system architecture evolution temporary mobile subscriber identity" (S-TMSI) value. Wherein the network connection request may contain "no indication" that the connection should be routed to a particular other network component or core network element when a RRC_CONNECTION_SETUP_COMPLETE message either fails to contain a registered mobility management entity identity (MMEI) or contains an invalid MMEI. Wherein the indication that the connection should be routed to the particular other network component or core network element may comprise the RRC_CONNECTION_SETUP_COMPLETE message having a valid registered MMEI. Wherein the indication in the network connection request that the connection should be routed to the particular other network component or core network element may comprise using a "mobility management entity code" (MMEC) portion of a "system architecture evolution temporary mobile subscriber identity" (S-TMSI).

In another embodiment a network component is provided comprising a processor configured to promote the network component to receive a request for a network connection, the request containing a message, and wherein the processor is further configured to promote the network component to establish the network connection, determine whether the network component should perform selection of an other network component or core network element, and, responsive to a determination that the network component should not perform the selection, transmit the message to a first other network component or core network element that is specified in the message. Wherein the other network component or core network element may comprise a mobility management entity (MME). Wherein the processor may be further configured to promote the network component to, responsive to a determination that the network component may perform the selection, independently select a component or element from among any available core network or public land mobile network, and transmit the message to the selected component or element. Wherein the message to be transmitted by the network component may comprise a non-access stratum (NAS) message. Wherein the processor may be further configured to promote the network component to determine whether the network component should perform the selection by checking an indicator, wherein the indicator is contained in the message, and wherein the indicator indicates whether the selection is allowed.

The following 3GPP TSs are hereby incorporated by reference in their entireties: 23.003, 24.301, 24.302, 33.401, 36.300, and 36.331.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method implemented in a user equipment (UE), the method comprising:

initiating non-access stratum (NAS) signaling in order to establish a connection between the UE and one of a plurality of core network (CN) elements;

determining whether the UE is already attached for emergency bearer services;

responsive to the UE being already attached for emergency bearer services, causing transmission, by a NAS layer of a protocol stack of the UE, of a UE identification (ID) when requesting a radio resource control (RRC) connection for further NAS signaling, wherein the UE ID comprises data which is used to determine to which CN of a plurality of CNs the connection should be directed.

2. The method of claim 1 wherein the NAS signaling is used to perform at least one of a tracking area update (TAU), receiving an emergency call, or initiating an emergency call.

3. The method of claim 1 wherein the UE has ended a previous emergency call and moved to IDLE mode while remaining attached for emergency bearer services.

4. The method of claim 1 wherein the UE ID is inserted into a RRC_CONNECTION_REQUEST message.

5. The method of claim 1 wherein the UE ID comprises one of a "system architecture evolution temporary mobile subscriber identity" (S-TMSI), an "international mobile subscriber identity" (IMSI), and an "international mobile equipment identifier" (IMEI).

6. The method of claim 1 wherein the NAS layer is required to transmit both the UE ID and one or more elements of the group consisting of: a "globally unique mobility management entity identifier" (GUMMEI), a "mobility management entity identifier" (MMEI), and a "mobility management entity code" (MMEC).

7. The method of claim 1 wherein the method further comprises:

responsive to the UE not being already attached for emergency bearer services, either leaving blank or specifying an invalid value for a registered mobility management entity (MME) field within an RRC_CONNECTION_SETUP_COMPLETE message.

8. The method of claim 1 wherein the UE facilitates determining to which CN the connection should be directed by specifying a preferred mobility management entity (MME) indicated in a registered MME field of an RRC_CONNECTION_SETUP_COMPLETE message.

9. The method of claim 1 wherein, when requesting the RRC connection for further NAS signaling, the NAS layer transmits a "system architecture evolution temporary mobile subscriber identity" (S-TMSI), and wherein a "mobility management entity code" (MMEC) portion of the S-TMSI indicates the CN.

10. The method of claim 1 wherein the NAS signaling comprises a tracking area update (TAU).

11. A method implemented in a user equipment (UE), the method comprising:

deciding to request access to a network;

determining whether a network component, to which access is made, should perform other network component or core network element selection;

responsive to a UE determination that the network component should not perform other network component or core network element selection, providing an indicator, wherein the indicator comprises data that indicates to the network component that the network component should not independently perform other network component or core network element selection.

12. The method of claim 11 wherein determining whether the network component should perform other network component or core network element selection comprises determining whether a mobility management entity (MME) should perform the other network component or core network element selection.

13. The method of claim 11 wherein the indicator comprises data that indicates a particular MME which the network component should select.

14. The method of claim 11 wherein the indicator comprises a "MME_Selection_Not_Allowed" indicator.

15. The method of claim 11 further comprising providing the indicator in a RRC_CONNECTION_REQUEST message or a RRC_CONNECTION_SETUP_COMPLETE message.

16. The method of claim 11 wherein deciding to request access to the network and determining if the network component should perform other network component or core network element selection are performed by a non-access stratum (NAS) layer of the UE, wherein, before providing, the NAS layer passes the indicator to an access stratum (AS) layer of the UE, and wherein the AS layer performs providing.

17. The method of claim 11 wherein, responsive to a UE determination that the network component should perform other network component or core network element selection, populating one of a RRC_CONNECTION_REQUEST message or a RRC_CONNECTION_SETUP_COMPLETE message with a second indicator, wherein the second indicator comprises data that indicates to the network component that the network component should independently perform other network component or core network element selection.

18. A user equipment (UE) comprising:

a processor configured such that the UE initiates non-access stratum (NAS) signaling in order to establish a connection between the UE and one of a plurality of core network (CN) elements; wherein the processor is further configured such that the UE determines whether the UE is already attached for emergency bearer services, and wherein the processor is further configured such that the UE, responsive to the UE being already attached for emergency bearer services, causes transmission, by a NAS layer of a protocol stack of the UE, of a UE identification (ID) when requesting a radio resource control (RRC) connection for further NAS signaling, wherein the UE ID comprises data which is used to determine to which CN of a plurality of CNs the connection should be directed.

19. The UE of claim 18 wherein the UE is further configured to use the NAS signaling to perform at least one of a tracking area update (TAU), receiving an emergency call, or initiating an emergency call.

20. The UE of claim 18 wherein the UE is further configured such that, after ending a previous emergency call and moving to IDLE mode, the UE will remain attached for emergency bearer services.

21. The UE of claim 18 wherein the UE is further configured to insert the UE ID into a RRC_CONNECTION_REQUEST message.

22. The UE of claim 18 wherein the UE ID comprises one of a "system architecture evolution temporary mobile subscriber identity" (S-TMSI), an "international mobile subscriber identity" (IMSI), and an "international mobile equipment identifier" (IMEI).

23. The UE of claim 18 wherein the UE is further configured such that the NAS layer is required to transmit both the UE ID and one or more elements of the group consisting of: a "globally unique mobility management entity identifier" (GUMMEI), a "mobility management entity identifier" (MMEI), and a "mobility management entity code" (MMEC).

24. The UE of claim 18 wherein the UE is further configured to cause the UE, responsive to the UE not being already attached for emergency bearer services, either to leave blank or to specify an invalid value for a registered mobility management entity (MME) field within an RRC_CONNECTION_SETUP_COMPLETE message.

25. The UE of claim 18 wherein the UE is further configured to cause the UE to facilitate determining to which CN the connection should be directed by specifying a preferred mobility management entity (MME) indicated in a registered MME field of an RRC_CONNECTION_SETUP_COMPLETE message.

26. The UE of claim 18 wherein the UE is further configured to, when requesting the RRC connection for further NAS signaling, cause the NAS layer to transmit a "system architecture evolution temporary mobile subscriber identity" (S-TMSI), and wherein a "mobility management entity code" (MMEC) portion of the S-TMSI indicates the CN.

27. The UE of claim 18 wherein the NAS signaling comprises a tracking area update (TAU).

28. A user equipment (UE) comprising:

a processor configured such that the UE will decide to request access to a network, determine whether a network component, to which access is made, should perform other network component or core network element selection, and, responsive to a UE determination that the network component should not perform other network component or core network element selection, provide an indicator, wherein the indicator comprises data that indicates to the network component that the network component should not independently perform other network component or core network element selection.

29. The UE of claim 28 wherein the processor is further configured such that the UE determining whether the network component should perform other network component or core network element selection comprises the UE determining whether a mobility management entity (MME) should perform the other network component or core network element selection.

30. The UE of claim 28 wherein the indicator comprises data that indicates a particular MME which the network component should select.

31. The UE of claim 28 wherein the indicator comprises a "MME_Selection_Not_Allowed" indicator.

32. The UE of claim 28 wherein the processor is further configured such that the UE will further provide the indicator in a RRC_CONNECTION_REQUEST message or a RRC_CONNECTION_SETUP_COMPLETE message.

33. The UE of claim 28 wherein the processor is further configured such that the UE will decide to request access to the network and determine if the network component should perform other network component or core network element selection in a non-access stratum (NAS) layer of the UE, wherein, before providing, the processor is further configured such that the UE NAS layer passes the indicator to an access stratum (AS) layer of the UE, and wherein the processor is further configured such that the UE AS layer will perform providing.

34. The UE of claim 28 wherein the processor is further configured such that the UE, responsive to a UE determination that the network component should perform other network component or core network element selection, will populate one of a RRC_CONNECTION_REQUEST message or a RRC_CONNECTION_SETUP_COMPLETE message with a second indicator, wherein the second indicator comprises data that indicates to the network component that the network component should independently perform other network component or core network element selection.

* * * * *